(12) United States Patent
Ding et al.

(10) Patent No.: US 12,452,916 B2
(45) Date of Patent: Oct. 21, 2025

(54) RESOURCE RESERVATION METHOD AND APPARATUS, DEVICE AND STORAGE MEDIUM

(71) Applicant: GUANGDONG OPPO MOBILE TELECOMMUNICATIONS CORP., LTD., Dongguan (CN)

(72) Inventors: Yi Ding, Dongguan (CN); Huei-Ming Lin, South Yarra (AU); Zhenshan Zhao, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 435 days.

(21) Appl. No.: 17/972,430

(22) Filed: Oct. 24, 2022

(65) Prior Publication Data
US 2023/0047819 A1    Feb. 16, 2023

Related U.S. Application Data

(63) Continuation of application No. PCT/CN2020/087560, filed on Apr. 28, 2020.

(51) Int. Cl.
*H04W 74/0808*    (2024.01)
*H04W 16/14*    (2009.01)
(Continued)

(52) U.S. Cl.
CPC ....... *H04W 74/0808* (2013.01); *H04W 16/14* (2013.01); *H04W 72/044* (2013.01); *H04W 92/18* (2013.01)

(58) Field of Classification Search
CPC ............ H04W 74/0808; H04W 16/14; H04W 72/044
See application file for complete search history.

(56) References Cited

U.S. PATENT DOCUMENTS

| 2021/0144750 | A1* | 5/2021 | Cao | H04W 72/0453 |
| 2021/0345396 | A1* | 11/2021 | Yu | H04W 72/21 |
| 2022/0015071 | A1* | 1/2022 | Hui | H04W 72/56 |

FOREIGN PATENT DOCUMENTS

CN    110891314 A    3/2020

OTHER PUBLICATIONS

Guangdong OPPO Mobile Telecommunications Corp. Ltd., International Search Report and Written Opinion, PCT/CN2020/087560, Jan. 27, 2021, 40 pgs.

(Continued)

*Primary Examiner* — Won Tae C Kim
(74) *Attorney, Agent, or Firm* — Morgan, Lewis & Bockius LLP

(57) ABSTRACT

The present disclosure relates to the technical field of communications, and disclosed are a resource reservation method and apparatus, a device and a storage medium. The method comprises: once LBT is successful, sending sidelink control information, wherein the sidelink control information is used to indicate N transmission resources reserved for a first transmission block, and the upper limit value of N is an integer greater than 3. Provided in the embodiments of the present application is a method for indicating transmission resources reserved by a terminal device when performing sidelink transmission on the basis of an unlicensed spectrum. Moreover, the sidelink control information sent by the terminal device may indicate more than three transmission resources, so that the reserved transmission resources may be indicated as much as possible in the sidelink control information.

7 Claims, 7 Drawing Sheets

```
┌─────────────────────────────────────────────┐
│  Perform LBT on an unlicensed spectrum       │─ 1210
└─────────────────────────────────────────────┘
                     │
                     ▼
┌─────────────────────────────────────────────┐
│ Send sidelink control information after LBT  │
│ is successful, the sidelink control          │
│ information including a second period field  │
│ and a second period parameter field; the     │
│ second period field being used to indicate   │─ 1220
│ a second time-domain period between periodic │
│ transmission resource sets reserved for M    │
│ transport blocks, and the second period      │
│ parameter field being used to indicate the   │
│ number of reserved periods of the            │
│ transmission resource set, M being an        │
│ integer greater than 1                       │
└─────────────────────────────────────────────┘
```

(51) Int. Cl.
*H04W 72/044* (2023.01)
*H04W 92/18* (2009.01)

(56) References Cited

OTHER PUBLICATIONS

Interdigital, Inc., "NR Sidelink Mode 2 Resource Allocation", 3GPP TSG RAN WG1 Meeting #98bis, R1-1911278, Chongqing, China, Oct. 14-20, 2019, 8 pgs.
VIVO, "Discussion on Mode 2 Resource Allocation Mechanism", 3GPP TSG RAN WG1 Meeting #99, R1-1912022, Reno, USA, Nov. 18-22, 2019, 10 pgs.
VIVO, "Discussion on Mode 2 Resource Allocation Mechanism", 3GPP TSG RAN WG1 Meeting #98bis, R1-1910213, Chongqing, China, Oct. 14-20, 2019, 13 pgs.
Guangdong OPPO Mobile Telecommunications Corp. Ltd., EP20933022.4, Extended European Search Report, May 4, 2023, 9 pgs.
Mode 2a and Mode 2d for NR V2X Resource Allocation R1-1900769-XP051593615.
Left issues on HARQ for NR-V2X R2-1914461-XP051816541.
Mode 2 resource allocation mechanism for NR sidelink R1-1911028-XP0 51809253.

* cited by examiner

Terminal device 150

1

RESOURCE RESERVATION METHOD AND APPARATUS, DEVICE AND STORAGE MEDIUM

CROSS-REFERENCE TO RELATED APPLICATIONS

This application is a continuation application of PCT Patent Application No. PCT/CN2020/087560, entitled "RESOURCE RESERVATION METHOD AND APPARATUS, DEVICE AND STORAGE MEDIUM" filed on Apr. 28, 2020, which is incorporated herein by reference in its entirety.

TECHNICAL FIELD

Embodiments of the present disclosure relate to the field of communication technologies, and more particularly, to a method and apparatus for resource reservation, a device and a storage medium.

BACKGROUND

Different from reception or transmission of communication data through an access network device in a traditional cellular system, sidelink (SL) transmission refers to a direct transmission of the communication data between terminal devices through a sidelink.

Regarding the SL transmission, 3rd Generation Partnership Project (3GPP) defines two transmission modes: mode A and mode B. For the mode A, a transmission resource of a SL User Equipment (UE) is assigned by the access network device, the SL UE transmits the communication data on the sidelink according to the transmission resources assigned by the access network device, and the access network device can assign the transmission resource for a single transmission to the SL UE, or can assign the transmission resource for semi-persistent transmission to the SL UE. For the mode B, the SL UE selects a transmission resource in a resource pool to transmit the communication data, and the SL UE can select the transmission resource from the resource pool by way of sensing, or randomly select the transmission resource from the resource pool.

SUMMARY

Embodiments of the present disclosure provide a method and apparatus for resource reservation, a device and a storage medium. The technical solutions are as follows.

In an aspect, the embodiments of the present disclosure provide a method for resource reservation, which is applied to a terminal device that performs sidelink transmission on an unlicensed spectrum, and the method includes:

performing Listen Before Talk (LBT) on the unlicensed spectrum; and sending sidelink control information after the LBT is successful, wherein the sidelink control information is used to indicate N transmission resources reserved for a first transport block, and an upper limit of N is an integer greater than 3.

In another aspect, the embodiments of the present disclosure provide a method for resource reservation, which is applied to a terminal device that performs sidelink transmission on an unlicensed spectrum, and the method includes:

performing LBT on the unlicensed spectrum; and sending sidelink control information after the LBT is successful, wherein the sidelink control information includes a second period field and a second period parameter field;

wherein the second period field is used to indicate a second time-domain period between periodic transmission resource sets reserved for M transport blocks, and the second period parameter field is used to indicate the number of reserved periods of the transmission resource sets, M being an integer greater than 1.

In still another aspect, the embodiments of the present disclosure provide an apparatus for resource reservation, provided in a terminal device that performs sidelink transmission on an unlicensed spectrum, and the apparatus includes:

a LBT performing module, configured to perform LBT on the unlicensed spectrum; and a first information sending module, configured to send sidelink control information after the LBT is successful, wherein the sidelink control information is used to indicate N transmission resources reserved for a first transport block, and an upper limit of N is an integer greater than 3.

In still another aspect, the embodiments of the present disclosure provide an apparatus for resource reservation, provided in a terminal device that performs sidelink transmission on an unlicensed spectrum, and the apparatus includes:

a LBT performing module, configured to perform LBT on the unlicensed spectrum; and a second information sending module, configured to send sidelink control information after the LBT is successful, wherein the sidelink control information includes a second period field and a second period parameter field;

wherein the second period field is used to indicate a second time-domain period between periodic transmission resource sets reserved for M transport blocks, and the second period parameter field is used to indicate the number of reserved periods of the transmission resource sets, M being an integer greater than 1.

In still another aspect, the embodiments of the present disclosure provide a terminal device, including a processor and a transceiver connected to the processor; wherein:

the processor is configured to perform LBT on an unlicensed spectrum;

the transceiver is configured to send sidelink control information after the LBT is successful, wherein the sidelink control information is used to indicate N transmission resources reserved for a first transport block, and an upper limit value of N is an integer greater than 3.

In still another aspect, the embodiments of the present disclosure provide a terminal device, including a processor and a transceiver connected to the processor; wherein:

the processor is configured to perform LBT on an unlicensed spectrum;

the transceiver is configured to send sidelink control information after the LBT is successful, wherein the sidelink control information includes a second period field and a second period parameter field;

wherein the second period field is used to indicate a second time-domain period between periodic transmission resource sets reserved for M transport blocks, and the second period parameter field is used to indicate the number of reserved periods of the transmission resource sets, M being an integer greater than 1.

In still another aspect, the embodiments of the present disclosure provide a non-transitory computer-readable storage medium having stored thereon a computer program, wherein the computer program is configured to be executed by a processor of a terminal device to implement the method for resource reservation as described above.

In still another aspect, the embodiments of the present disclosure provide a chip, including a programmable logic circuit and/or program instructions, wherein the chip is configured to implement the method for resource reservation as described above when running on a terminal device.

BRIEF DESCRIPTION OF THE DRAWINGS

In order to illustrate the technical solutions in embodiments of the present disclosure more clearly, the drawings that are used in the description of the embodiments are briefly explained below. Obviously, the drawings involved in the following description show only some embodiments of the present disclosure, and other drawings can also be obtained by those of ordinary skill in the art based on these drawings without creative effort.

DETAILED DESCRIPTION

In order to make objectives, technical solutions and advantages of the present disclosure clearer, implementations of the present disclosure will be further described in detail below in combination with the drawings.

The network architecture and service scenarios described in the embodiments of the present disclosure are for the purpose of illustrating the technical solutions of the embodiments of the present disclosure more clearly, and do not constitute a limitation on the technical solutions provided by the embodiments of the present disclosure. A person of ordinary skill in the art understands that with the evolution of the network architecture and the emergence of new service scenarios, the technical solutions provided in the embodiments of the present disclosure are also applicable to solve similar technical problems.

Figure 1:
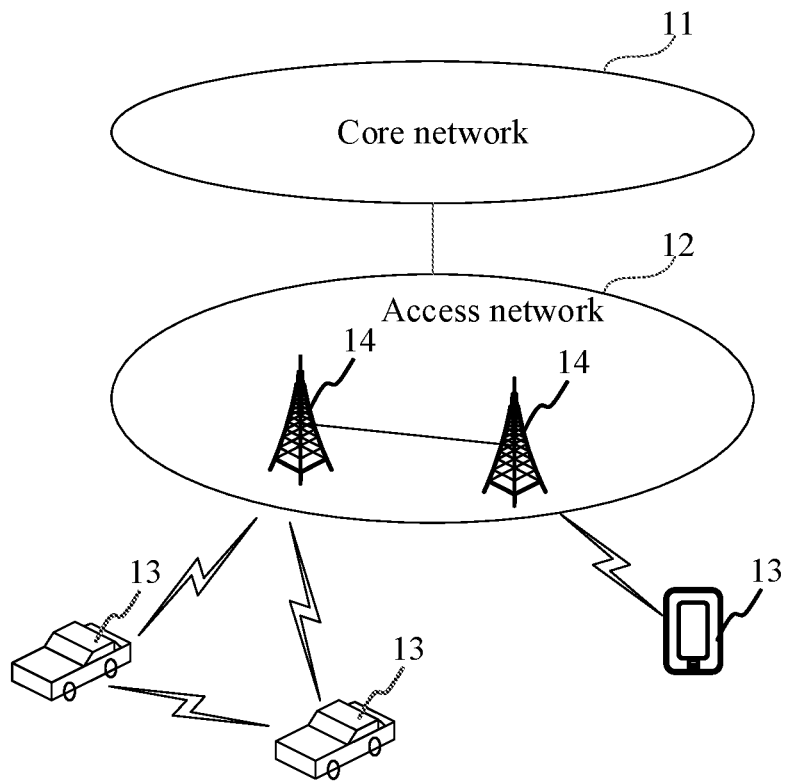
FIG. 1 is a schematic diagram of a network architecture provided by an embodiment of the present disclosure.

Referring to FIG. 1, it shows a schematic diagram of a network architecture provided by an embodiment of the present disclosure. The network architecture may include a core network 11, an access network 12 and a terminal 13.

The core network 11 includes several core network devices. Functions of the core network device are mainly to provide user connection and user management and to implement bearing for service, and functions as a bearer network to provide an interface to an external network. For example, a core network of a 5th Generation (5G) New Radio (NR) system may include an Access and Mobility Management Function (AMF) entity, a User Plane Function (UPF) entity, a Session Management Function (SMF) entity and other devices.

The access network 12 includes several access network devices 14. The access network in the 5G NR system may be called New Generation-Radio Access Network (NG-RAN). The access network device 14 is a device that is deployed in the access network 12 and is used to provide wireless communication functions for the terminal device 13. The access network device 14 may include various forms of macro base stations, micro base stations, relay stations, access points, etc. In systems employing different wireless access technologies, the devices with functions of the access network device may be named differently, for example, in 5G NR systems, they are called gNodeB or gNB. With the evolution of communication technologies, the name "access network device" may change. For convenience of description, in the embodiments of the present disclosure, the apparatuses for providing the wireless communication functions for the terminal device 13 as described above are collectively referred to as access network devices.

There are typically a plurality of terminal devices 13, and one or more terminal devices 13 may be distributed in a cell managed by each access network device 14. The terminal device 13 may include various handheld devices, vehicle-mounted devices, wearable devices, computing devices, or other processing devices connected to wireless modems, as well as various forms of User Equipment (UE), Mobile Stations (MS) and so on that have the wireless communication functions. For convenience of description, the above-mentioned devices are collectively referred to as terminal devices. The access network device 14 and the core network device communicate with each other through a certain air technology, such as a NG interface in the 5G NR system. The access network device 14 and the terminal device 13 communicate with each other through a certain air technology, such as a Uu interface.

The terminal devices 13 (for example, a vehicle-mounted device and another device such as another vehicle-mounted device, a mobile phone, a Road Side Unit (RSU), etc.) can communicate with each other through a direct-connection communication interface (such as a PC5 interface), and correspondingly, a communication link established based on the direct-connection communication interface may be referred to as a direct link or sidelink (SL). The SL transmission is a direct communication of communication data between the terminal devices through the sidelink. Different from reception or transmission of the communication data through the access network device in a traditional cellular system, the SL transmission has characteristics of short delay, low overhead, etc., which is suitable for communication between two terminal devices that are geographically close (such as the vehicle-mounted device and other peripheral devices that are geographically close).

The "5G NR system" in the embodiments of the present disclosure may also be referred to as a 5G system or an NR system, and those skilled in the art can understand the meaning thereof. The technical solutions described in the embodiments of the present disclosure can apply to the 5G NR system, and can also apply to subsequent evolution systems of the 5G NR system.

Regarding the SL transmission, 3GPP defines two transmission modes: mode A and mode B. For the mode A, a transmission resource of a SL UE is assigned by the access network device, the SL UE transmits the communication data on the sidelink according to the transmission resource assigned by the access network device, and the access network device can assign the transmission resource for a single transmission to the SL UE, or can assign the transmission resource for semi-persistent transmission to the SL UE. For the mode B, the SL UE selects the transmission resource in a resource pool to transmit the communication data, and the SL UE can select the transmission resource from the resource pool by way of sensing, or randomly select the transmission resource from the resource pool.

In an example, for the above mode B, the autonomous selection of the transmission resource by the SL UE from the resource pool is based on resource reservation, resource sensing and resource exclusion. The resource reservation, the resource sensing and the resource exclusion are described below.

First, a physical layer structure of the SL is explained.

Figure 2:
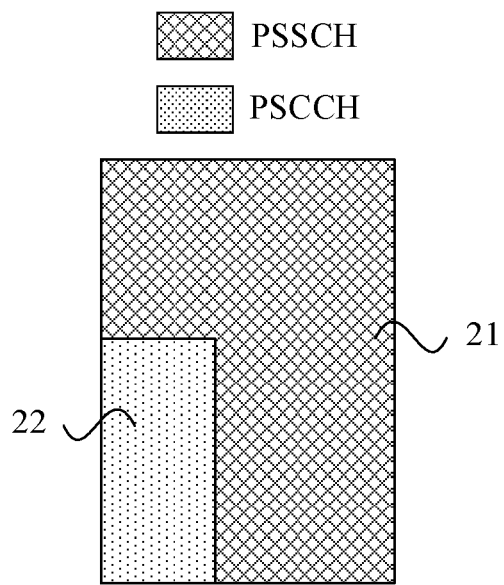
FIG. 2 is a schematic diagram of a physical layer structure of a SL provided by an embodiment of the present disclosure.

Referring to FIG. 2, it shows a schematic diagram of a physical layer structure of a SL provided by an embodiment of the present disclosure. In FIG. 2, a physical channel 21 is a Physical Sidelink Shared Channel (PSSCH), and the communication data of the SL communication is carried in the PSSCH, a physical channel 22 is a Physical Sidelink Control Channel (PSCCH), and control information of the SL communication is carried in the PSCCH. It can be seen from FIG. 2 that the physical channel 22 is included in the physical channel 21, which means that the control information carried in the PSCCH and the communication data carried in the PSSCH are sent simultaneously in the SL transmission.

Next, the resource reservation is explained.

Figure 3:
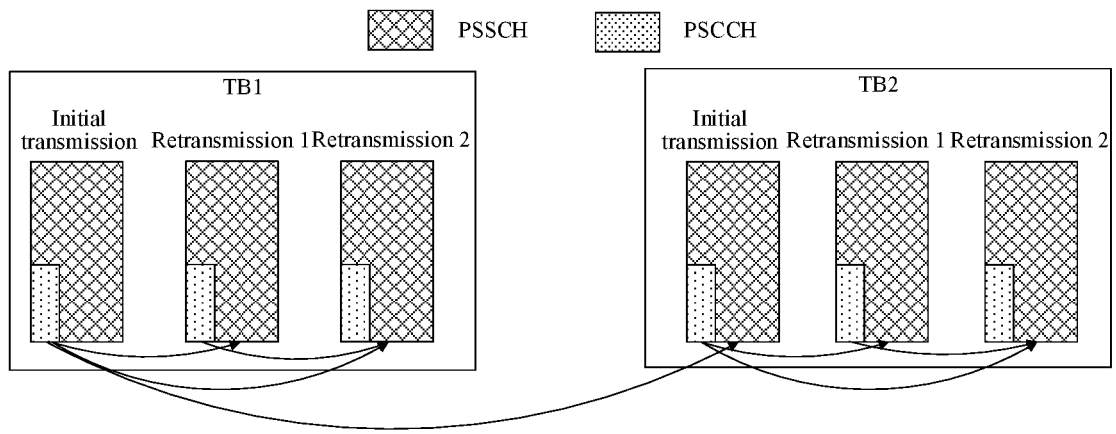
FIG. 3 is a schematic diagram of time-frequency resource position reservation provided by an embodiment of the present disclosure.

The SL UE can perform the resource reservation by sending sidelink control information in the PSCCH as described above. The SL UE can indicate transmission resources reserved for a current data Transport Block (TB) through two fields of "time resource assignment" and "frequency resource assignment" in the sidelink control information. As shown in FIG. 3, the SL UE sends the sidelink control information in a PSCCH used for an initial transmission of TB1, and uses the above two fields to indicate to other UEs positions of time-frequency resources that are reserved by the SL UE for retransmission 1 and retransmission 2 of TB1. Due to limitations on the signaling overhead and the number of bits of the sidelink control information, the above two fields can indicate at most three time-frequency resource positions (including a current time-frequency resource position) reserved for the current TB. As shown in FIG. 3, the sidelink control information sent in the initial transmission of TB1 indicates in TB1 at most the time-frequency resource positions reserved for the initial transmission, the retransmission 1 and the retransmission 2 of TB1.

In addition, the SL UE indicates the positions of the time-frequency resources that it reserves for a next TB through a "Resource reservation period" field in the sidelink control information. As shown in FIG. 3, the SL UE sends the sidelink control information in the PSCCH used for the initial transmission of TB1, and uses the "Resource reservation period" field to indicate to other UEs a time interval between an initial transmission of TB2 and the initial transmission of TB1. In addition, since the protocol predefines that a frequency-domain resource position for the initial transmission of TB1 is the same as a frequency-domain resource position for the initial transmission of TB2, the SL UE can indicate the time-frequency resource position that it reserves for the initial transmission of TB2 through the sidelink control information sent in the initial transmission of TB1.

In addition, since the protocol predefines that the "Resource reservation period" field in the sidelink control information sent by the SL UE in the PSCCHs used for the initial transmission, the retransmission 1 and the retransmission 2 of TB1 will not change, a time-domain interval between a time domain resource position reserved for the initial transmission of TB1 and a time-domain resource position reserved for the initial transmission of TB2, a time-domain interval between a time domain resource position reserved for the retransmission 1 of TB1 and a time-domain resource position reserved for the retransmission 1 of TB2, and a time-domain interval between a time domain resource position reserved for the retransmission 2 of TB1 and a time-domain resource position reserved for the retransmission 2 of TB2 are the same. In addition, the sidelink control information sent by the SL UE in the initial transmission of the TB1 will also indicate the time-frequency resource positions reserved for the retransmission 1 and the retransmission 2 of the TB1. Therefore, the SL UE indirectly indicates, in the sidelink control information sent in the initial transmission of the TB1, the time-frequency resource positions reserved for the retransmission 1 and the retransmission 2 of the TB2.

In a similar fashion, for the description regarding the SL UE indicating the time-frequency resource position reserved for retransmission 2 of TB1 and the time-frequency resource positions reserved for the retransmission 1 and the retransmission 2 of TB2 in the sidelink control information sent in the PSCCH used for the retransmission 1 of TB1, reference may be made to the description regarding the sidelink control information sent by the SL UE in the PSCCH used for the initial transmission of TB1, which is not repeated here.

The configuration of the resource pool used by the SL UE includes a configured or preconfigured resource reservation period set M, and the SL UE selects a resource reservation period from the resource reservation period set M and puts it into the "Resource reservation period" field corresponding to its sidelink control information, so that the resource reservation between TBs can be performed. In NR SL, possible values of the resource reservation period include 0 millisecond (ms), [1, 99] ms, 100 ms, 200 ms, 300 ms, 400 ms, 500 ms, 600 ms, 700 ms, 800 ms, 900 ms and 1000 ms, and the resource reservation period set M in the configuration of the resource pool consists of k of the above possible values, where k is a positive integer. As an example, k is equal to 16.

Next, the resource sensing and the resource exclusion is explained.

By sensing the sidelink control information sent by other UEs in the PSCCHs, the SL UE performing the resource selection can determine the time-frequency resource positions reserved by other UEs for TBs, and exclude the time-frequency resource positions reserved by other UEs for TBs from a resource selection window, which can avoid the occurrence of resource collision.

Figure 4:
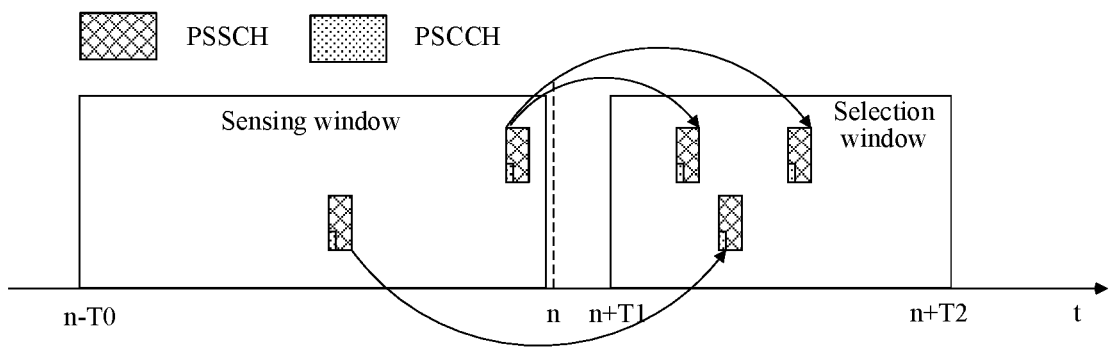
FIG. 4 is a schematic diagram of resource sensing and resource selection provided by an embodiment of the present disclosure.

As shown in FIG. 4, the SL UE generates a data packet at time n and needs to perform the resource selection. It is assumed that all resources in the resource selection window form a set A, where the resource selection window starts at time n+T1 and ends at time n+T2. T1 is greater than or equal to 0, and is less than or equal to Tproc,1, where Tproc,1 is a time period for the SL UE to perform the resource selection and prepare the data. T2 is greater than or equal to $T2_{min}$, and is less than or equal to a delay range of service requirements, where a value of $T2_{min}$ is $\{1, 5, 10, 20\}*2^\mu$ slots, where $\mu=0, 1, 2, 3$, corresponding to subcarrier spacings of 15, 30, 60, and 120 Kilo Hertz (KHz), respectively. When $T2_{min}$ is greater than the delay range of service requirements, T2 can be equal to the delay range of service requirements.

As shown in FIG. 4, the SL UE performs the resource sensing from a time n-T0 to a time n-Tproc,0, where a value of T0 is 100 ms or 1100 ms; and Tproc,0 is a time period for the SL UE to decode the sidelink control information.

A process of resource selection performed by the SL UE is described in the following, and the process can be divided into two steps.

In step 1, if the SL UE sends data in some slots of a resource sensing window and does not perform sensing, all transmission resources in slots of the resource selection window that correspond to these slots are excluded. For example, the SL UE does not perform the resource sensing in a slot tm, assuming that the configuration of the resource pool used by the SL UE includes the resource reservation period set M={100, 200, 300, 400, 500, 600, 700, 800}ms, then the SL UE will calculate to determine whether slots tm+100 ms, tm+200 ms, tm+300 ms, tm+400 ms, tm+500 ms, tm+600 ms, tm+700 ms, tm+800 ms are within the resource selection window, and if the slots tm+100 ms, tm+200 ms, tm+300 ms, tm+400 ms, and tm+500 ms are within the resource selection window, the SL UE excludes from the set A all the transmission resources in these slots.

If the SL UE senses the control information transmitted in a PSCCH within the sensing window, it measures RSRP of the PSCCH or RSRP of a PSSCH scheduled by the PSCCH (that is, the RSRP of the PSSCH that is sent simultaneously with the PSCCH). If the measured RSRP is greater than a SL-RSRP threshold, and it is determined from the resource reservation information ("time resource assignment", "frequency resource assignment" and "Resource reservation period") in the sidelink control information transmitted in the PSCCH that the transmission resource reserved by the SL UE for TB is within the resource selection window, the corresponding transmission resource is excluded from the set A. If the remaining transmission resources in the set A are less than X %, such as 20%, of the total transmission resources in the set A before the resource exclusion, the SL UE increases the SL-RSRP threshold by 3 dB, and repeats the step 1.

It should be noted that whether the SL UE compares the measured RSRP of the PSCCH or the measured RSRP of the PSSCH scheduled by the PSCCH with the SL-RSRP threshold depends on the configuration of the resource pool used by the SL UE. The configuration of the resource pool can be configured by the network device or preconfigured.

In step 2, after performing the resource exclusion, the SL UE may randomly select several transmission resources from the set A, as transmission resources used for the initial transmission and the retransmission.

It should be noted that the RSRP threshold is determined by a priority P1 carried in the PSCCH sensed by the SL UE and a priority P2 of data to be sent by the SL UE. The SL UE obtains a SL-RSRP threshold table that is configured by the network device or preconfigured, and the SL-RSRP threshold table includes SL-RSRP thresholds corresponding to all priority combinations. For example, as shown in Table 1 below, assuming that possible values of priority levels of P1 and P2 are both 0 to 7, SL-RSRP thresholds corresponding to different priority combinations are represented by $\gamma_{ij}$, where i in $\gamma_{ij}$ is a value of the priority level P1, and j in $\gamma_{ij}$ is a value of the priority level P2.

TABLE 1

SL-RSRP threshold table

| P2 | P1 | | | | | | | |
|---|---|---|---|---|---|---|---|---|
| | 0 | 1 | 2 | 3 | 4 | 5 | 6 | 7 |
| 0 | $\gamma_{00}$ | $\gamma_{01}$ | $\gamma_{02}$ | $\gamma_{03}$ | $\gamma_{04}$ | $\gamma_{05}$ | $\gamma_{06}$ | $\gamma_{07}$ |
| 1 | $\gamma_{10}$ | $\gamma_{11}$ | $\gamma_{12}$ | $\gamma_{13}$ | $\gamma_{14}$ | $\gamma_{15}$ | $\gamma_{16}$ | $\gamma_{17}$ |
| 2 | $\gamma_{20}$ | $\gamma_{21}$ | $\gamma_{22}$ | $\gamma_{23}$ | $\gamma_{24}$ | $\gamma_{25}$ | $\gamma_{26}$ | $\gamma_{27}$ |
| 3 | $\gamma_{30}$ | $\gamma_{31}$ | $\gamma_{32}$ | $\gamma_{33}$ | $\gamma_{34}$ | $\gamma_{35}$ | $\gamma_{36}$ | $\gamma_{37}$ |
| 4 | $\gamma_{40}$ | $\gamma_{41}$ | $\gamma_{42}$ | $\gamma_{43}$ | $\gamma_{44}$ | $\gamma_{45}$ | $\gamma_{46}$ | $\gamma_{47}$ |
| 5 | $\gamma_{50}$ | $\gamma_{51}$ | $\gamma_{52}$ | $\gamma_{53}$ | $\gamma_{54}$ | $\gamma_{55}$ | $\gamma_{56}$ | $\gamma_{57}$ |
| 6 | $\gamma_{60}$ | $\gamma_{61}$ | $\gamma_{62}$ | $\gamma_{63}$ | $\gamma_{64}$ | $\gamma_{65}$ | $\gamma_{66}$ | $\gamma_{67}$ |
| 7 | $\gamma_{70}$ | $\gamma_{71}$ | $\gamma_{72}$ | $\gamma_{73}$ | $\gamma_{74}$ | $\gamma_{75}$ | $\gamma_{76}$ | $\gamma_{77}$ |

When the SL UE senses the control information sent by another UE in the PSCCH, it obtains the priority P1 carried in the sidelink control information transmitted in the PSCCH and the priority P2 of the data to be sent, and the SL UE may determine the SL-RSRP threshold by querying the above table 1.

Those described above are examples in which the SL UE autonomously reserves the transmission resource in the resource pool based on a licensed spectrum. However, for an unlicensed spectrum, the protocol has not defined how the SL UE reserves the transmission resource. The unlicensed spectrum and how the terminal device transmits the communication data based on the unlicensed spectrum will be described below.

First, the unlicensed spectrum is explained.

The unlicensed spectrum is a spectrum that can be used for communication of the terminal device, which is usually considered as a shared spectrum, that is, terminal devices in different communication systems can use the spectrum as long as they meet requirements set for the spectrum without additional application for a dedicated spectrum grant.

The requirements set for the spectrum have restriction on a bandwidth for the transmission performed by the terminal device on the unlicensed spectrum, that is, a span of the bandwidth occupied by the terminal device in transmitting the communication data is at least L % of a total spectrum bandwidth, where L is a positive number. For example, L is equal to 80. Assuming that the total bandwidth of the unlicensed spectrum is 100 Physical Resource Blocks (PRBs), a difference between the smallest PRB index and the largest PRB index that are used in transmitting the communication data by the terminal device should be at least 80 PRBs. If the terminal device needs 2 PRBs to send the data, and an index of one of the PRBs is PRB 1, an index of the other PRB is at least PRB 81.

Next, a LBT mechanism is described.

On the unlicensed spectrum, all terminal devices must perform LBT before transmitting the communication data, that is, before the terminal device performs data transmission on a transmission channel that is based on the unlicensed spectrum, it needs to perform channel sensing first, and the terminal device can send a signal only when a result of the channel sensing is that the channel is idle.

Figure 5:
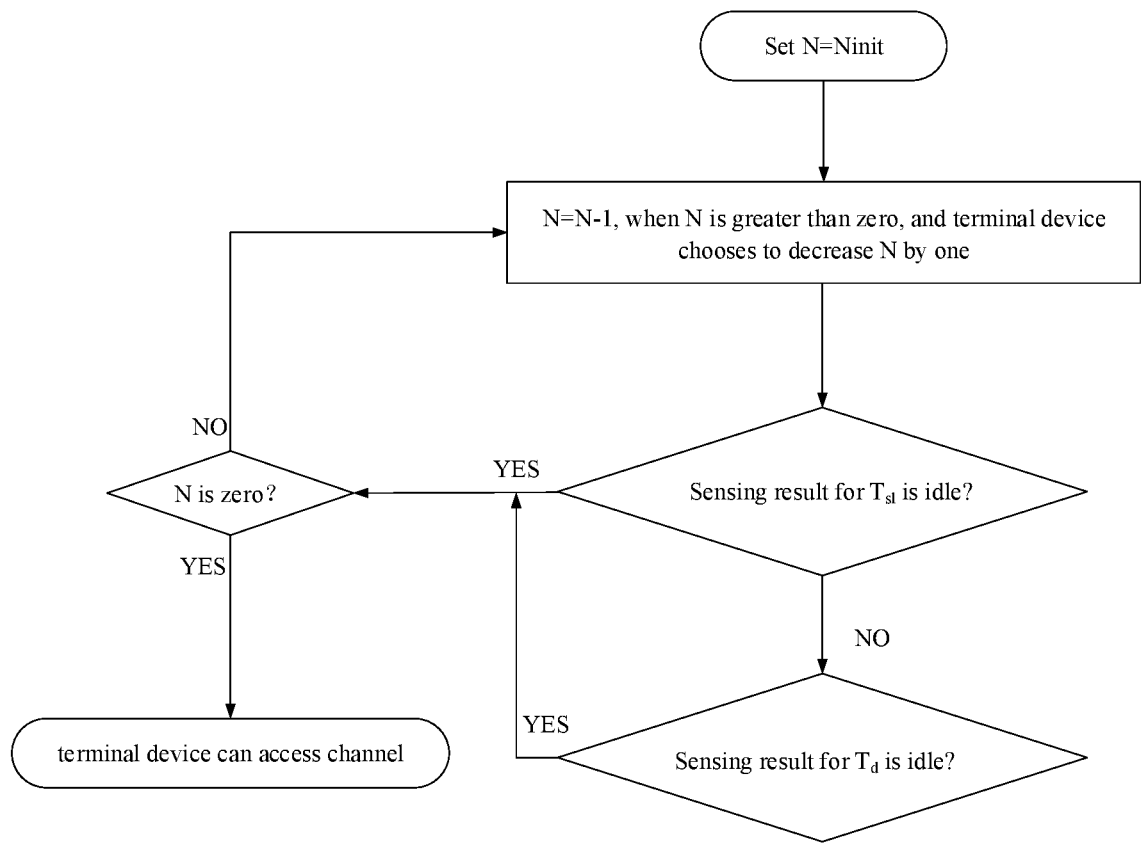
FIG. 5 is a schematic diagram of a LBT mechanism provided by an embodiment of the present disclosure.

Referring to FIG. 5, it shows a schematic diagram of a LBT mechanism provided by an embodiment of the present disclosure. In the LBT mechanism, a communication device first sets $N=N_{init}$, where $N_{init}$ is a random value from 0 to $CW_p$ with an equal probability, and $CW_p$ is related to a priority of a channel access by the terminal device. The following table 2 shows value ranges of different $CW_p$ corresponding to different priorities of the access channel.

TABLE 2 relationship between access channel priority and values of communication-related parameters

| Access channel priority (p) | $m_p$ | $CW_{min,p}$ | $CW_{max,p}$ | $T_{mcot,p}$ | Allowed $CW_p$ value |
|---|---|---|---|---|---|
| 1 | 2 | 3 | 7 | 2 ms | {3,7} |
| 2 | 2 | 7 | 15 | 4 ms | {7,15} |
| 3 | 3 | 15 | 1023 | 6 or 10 ms | {15,31,63,127,255,511,1023} |
| 4 | 7 | 15 | 1023 | 6 or 10 ms | {15,31,63,127,255,511,1023} |

As shown in FIG. 5, when N>0 and the terminal device chooses to decrease N by one, N=N−1. The terminal device monitors the channel for a time length of $T_{sl}$, and the length of $T_{sl}$ is 9 microseconds. If it is sensed that the channel is busy (that is, there is another terminal device performing communication data transmission) in $T_{sl}$, the terminal device continues to monitor the channel. When the channel sensing result is idle within a time period of $T_d$, the terminal device then determines whether N is 0, that is, determining whether the LBT is successful or not, where $T_d=T_f+m_p*T_{sl}$, $T_f$ is equal to 16 microseconds, and $m_p$ is related to the priority of channel access, which can be obtained by querying from Table 2.

When N=0, that is, the LBT is successful, if the terminal device does not immediately access the channel, at a time when it needs to transmit communication data and accesses the channel, it does not need to perform all the above LBT processes again, but only needs to monitor the channel occupancy situation for a time period of $T_d$ plus at least one $T_{sl}$. If the channel is idle, the terminal device can directly access the channel to transmit communication data. After the LBT is successful and the terminal device accesses the channel, the time that the terminal device can occupy the channel is called a Channel Occupancy Time (COT). A length of the COT can be up to 20 milliseconds. Within the COT, the terminal device can transmit communication data continuously or discontinuously, but the total transmission time does not exceed $T_{mcot,p}$, where $T_{mcot,p}$ is related to the priority of channel access, which can also be obtained by querying the above Table 2.

Figure 6:
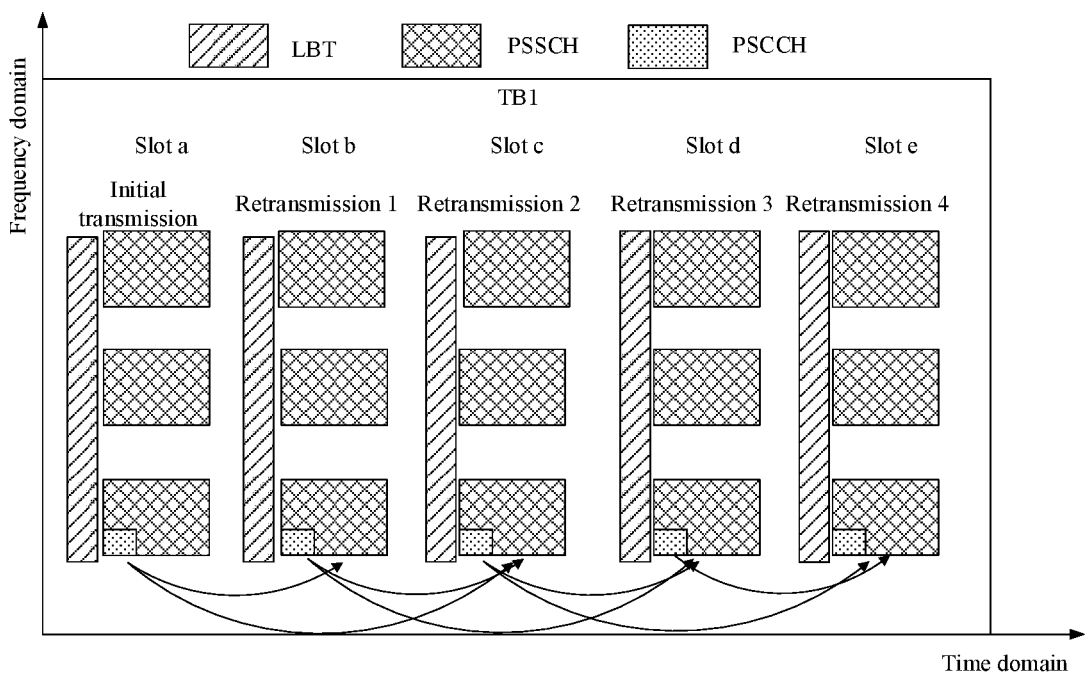
FIG. 6 is a schematic diagram of reserving transmission resources for a transport block provided by an embodiment of the present disclosure.

It can be seen from the above examples that the SL UE can reserve transmission resources to be used next for the TB by sending the sidelink control information in the PSCCH. However, for the unlicensed spectrum, the SL UE needs to perform LBT before sending communication data. If the LBT fails, the SL UE cannot send the communication data, that is, the SL UE cannot send the sidelink control information, and thus cannot notify other UEs of the transmission resources reserved by the SL UE for the TB. As shown in FIG. 6, it is assumed that SL UE 1 selects to perform initial transmission and retransmissions of TB 1 in Slot a, Slot b, Slot c, Slot d, and Slot e. In FIG. 6, the initial transmission and retransmissions of TB1 are not continuous in the frequency domain, which is for the purpose of meeting the above-mentioned requirements for the transmission bandwidth of the unlicensed spectrum. If the SL UE has a large amount of communication data to be sent and a large bandwidth is occupied, the transmission manner that is continuous in the frequency domain in FIG. 3 may also be used, which is not limited in the embodiments of the present disclosure. Because the signaling overhead and occupied bits of the control information are limited, the control information sent in Slot a can only indicate at most three transmission resources (including the current transmission resources) reserved for the current TB. It is assumed that the LBT of SL UE 1 fails before Slot c, then SL UE 1 cannot send data carried in PSCCH and PSSCH in Slot c, and cannot indicate to other UEs the transmission resources in Slot d and Slot e that are reserved for TB. When SL UE 2 selects resources between slots c and d, since it does not detect the sidelink control information sent by SL UE 1 in slot c, it will not exclude the transmission resources in slots d and e that are reserved by SL UE 1, and when SL UE 2 selects the transmission resource in slot d or slot e reserved by SL UE 1, resource collision will occur, reducing communication reliability.

In view of the above, an embodiment of the present disclosure provides a method for resource reservation, and according to this method, the SL UE can indicate transmission resources reserved for the transport block as many as possible based on the unlicensed spectrum.

Hereinafter, the technical solutions of the present disclosure will be introduced and described by way of several exemplary embodiments.

Figure 7:
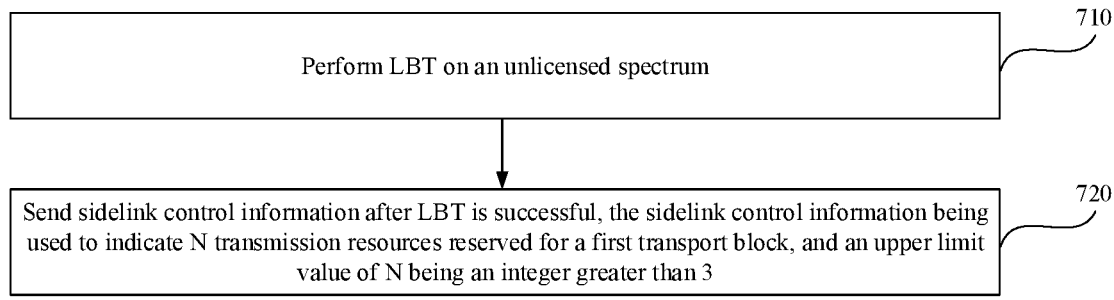
FIG. 7 is a flowchart of a method for resource reservation provided by an embodiment of the present disclosure.

Referring to FIG. 7, it shows a flowchart of a method for resource reservation provided by an embodiment of the present disclosure. The method can be applied to the network architecture as shown in FIG. 1, for example, applied to a terminal device that performs sidelink transmission on an unlicensed spectrum, and the method may include the following steps.

In step 710, LBT is performed on the unlicensed spectrum.

The terminal device needs to perform LBT prior to performing sidelink transmission on the unlicensed spectrum. In the embodiments of the method of the present disclosure, for the convenience of description, the terminal device that performs sidelink transmission on the unlicensed spectrum is referred to as an SL UE. In the embodiments of the present disclosure, when the SL UE determines that it needs to transmit communication data, it performs LBT before transmitting the communication data. During the LBT process, the SL UE detects a state of the channel for transmitting the communication data, and the channel state includes the idle channel and the busy channel. For the specific process of LBT, please refer to the description of the above-mentioned embodiments, and details are not repeated here.

In step 720, after the LBT succeeds, sidelink control information is sent, where the sidelink control information is used to indicate N transmission resources reserved for a first transport block, and an upper limit of N is an integer greater than 3.

After the LBT is successful, the SL UE can access the communication data transmission channel to send communication data. Optionally, the communication data transmission channel is a PSSCH. From the physical layer structure of the sidelink shown in FIG. 2 above, it can be seen that the communication data transmission channel includes a control information transmission channel, that is, the SL UE can send control information at the same time when sending the communication data. Optionally, the control information transmission channel is a PSCCH. In the embodiments of the present disclosure, since the SL UE performs sidelink transmission, the control information sent by the SL UE after the LBT is successful is called sidelink control information.

The sidelink control information is used to indicate N transmission resources reserved for the first transport block. The manner of determining N is not limited in the embodiments of the present disclosure. Optionally, N is configured by the network device or pre-configured for the terminal device; or, N is predefined by the communication protocol; or, N is determined by the SL UE autonomously according to its own service requirements; or, N is determined by the SL UE autonomously according to its own service requirements from a set of candidates configured by the network device or pre-configured for the SL UE. In determining the value of N in practice, the value may be determined in combination with the transmission delay range of the first transport block and the number of times of transmissions of the communication data corresponding to the first transport block.

Since the communication data is organized in the form of transport blocks, that is, the communication data is carried in the transport block, in the embodiments of the present disclosure, the first transport block carries the communication data that is sent simultaneously with the sidelink control information, and the first transport block is the transport block currently transmitted by the SL UE. It can be known from the description of the above embodiments that in order to make other terminal devices clear about the transmission resources reserved by the SL UE, the SL UE can send sidelink control information to indicate the N transmission resources that are reserved by the SL UE for the first transport block. The content of the transmission resource is not limited in the embodiments of the present disclosure. Optionally, the transmission resource includes a time-frequency resource position, that is, the transmission resource includes a time-domain resource position and a frequency-domain resource position.

It should be noted that, in the embodiments of the present disclosure, the N transmission resources reserved for the first transport block include the transmission resource for the currently transmitted communication data, that is, the transmission resource used for the communication data sent simultaneously with the sidelink control information is also included in the N transmission resources.

From the description of the above embodiments, when performing sidelink transmission on the licensed spectrum, due to the limitation on the signaling overhead and the number of occupied bits of the control information, the control information sent by the SL UE can only indicate at most three transmission resources reserved for the current transport block (including the current transmission resource). In the embodiments of the present disclosure, considering that the SL UE needs to perform LBT on the unlicensed spectrum and can transmit communication data only after the LBT succeeds, and thus in the case where the LBT fails, the SL UE will not be able to transmit communication data and thus cannot indicate the reserved transmission resources to other terminal devices, and if the sidelink control information sent by the SL UE does not indicate these reserved transmission resources when the previous LBT succeeds, other terminal devices cannot know the transmission resources reserved by the SL UE, and when the other terminal device just selects these reserved transmission resources to transmit communication data, resource collision with the SL UE will occur, reducing communication reliability. In view of this, the embodiments of the present disclosure propose that when performing sidelink transmission on an unlicensed spectrum, the sidelink control information sent by the SL UE indicates as many transmission resources reserved for the first transport block as possible, so that in the embodiments of the present disclosure, the sidelink control information is used to indicate N transmission resources reserved for the first transport block, and the upper limit of N is an integer greater than 3. That is, in the embodiments of the present disclosure, the sidelink control information sent by the SL UE can be either the same as the sidelink control information sent by the terminal device that performs the sidelink transmission on the licensed spectrum, indicating three or less transmission resources, or different from the sidelink control information sent by the terminal device that performs the sidelink transmission on the licensed spectrum, indicating more than three transmission resources, so as to indicate the transmission resources reserved for the first transport block as many as possible in the sidelink control information.

In a possible implementation, time-domain resource positions of the N transmission resources are located within a transmission delay range of the first transport block. For the transmission of the communication data, the transmission delay range is usually set. Within the transmission delay range, the terminal device can transmit the communication data multiple times to ensure that the communication data is transmitted to a data receiver in a timely and complete manner. In the embodiments of the present disclosure, the SL UE may use the reserved N transmission resources to transmit the communication data, but since the first transport block carrying the communication data is provided with the transmission delay range, the N transmission resources reserved for the first transport block should be located within the transmission delay range of the first transport block to ensure that the SL UE transmits the communication data within the transmission delay range.

To sum up, according to the technical solutions provided by the embodiments of the present disclosure, in a case where the terminal device performs the sidelink transmission on the unlicensed spectrum, the terminal device performs LBT on the unlicensed spectrum and after the LBT is successful, the terminal device sends the sidelink control information that is used to indicate the transmission resources reserved for the transport block, thereby providing a method for indicating the transmission resources reserved by the terminal device when the sidelink transmission is performed based on the unlicensed spectrum. Considering that on the unlicensed spectrum, the terminal device needs to the perform LBT and can only transmit the communication data after the LBT is successful, in a case where the LBT fails, the terminal device will not be able to transmit the communication data, and will not be able to indicate the reserved transmission resources to other terminal devices, and if the reserved transmission resources are not indicated in the sidelink control information sent by the terminal device when the previous LBT is successful, other terminal devices cannot know the transmission resources reserved by the terminal device, and when the reserved transmission resources are just selected by the other terminal devices to transmit the communication data, resource collision between the terminal device and other terminal devices may occur, reducing communication reliability. In the embodiments of the present disclosure, the sidelink control information sent by the terminal device may indicate more than three transmission resources, so that the reserved transmission resources may be indicated as many as possible in the sidelink control information so as to avoid the situation where it fails to continue to indicate the reserved transmission resources subsequently due to LBT failure, resulting in resource collision with other terminal devices. In the embodiments of the present disclosure, factors that affect communication quality are fully considered, and the communication reliability is improved.

In addition, in the technical solutions provided by the embodiments of the present disclosure, since the transmission of the communication data is typically set with the transmission delay range, and within the transmission delay range, the terminal device can transmit the communication data multiple times to ensure that the communication data is transmitted to the data receiver in a timely and complete manner. In the embodiments of the present disclosure, the terminal device may use the reserved transmission resources to transmit the communication data, and the transmission resources reserved for the transport block are located within the transmission delay range of the transport block so as to ensure that the terminal device transmits the communication data within the transmission delay range of the transport block.

The embodiments of the present disclosure provide several manners for the sidelink control information to indicate the N transmission resources, which are described below.

Manner 1: at least one transmission resource is indicated by a time-domain resource assignment field and/or a frequency-domain resource assignment field of the sidelink control information.

In an example, the sidelink control information includes the time-domain resource assignment field and/or the frequency-domain resource assignment field, the time-domain resource assignment field is used to indicate at least one time-domain resource position of the N transmission resources, and the frequency-domain resource assignment field is used to indicate at least one frequency-domain resource position of the N transmission resources.

In the embodiments of the present disclosure, the time-domain resource assignment field is used to indicate at least one time-domain resource position of the N transmission resources, and the frequency-domain resource assignment field is used to indicate at least one frequency-domain resource position of the N transmission resources. Optionally, the at least one time-domain resource position of the N transmission resources is N time-domain resource positions of the N transmission resources, and the at least one frequency-domain resource position of the N transmission resources is N frequency-domain resource positions of the N transmission resources. For example, a time-frequency domain resource position corresponding to a first transmission resource is indicated in the time-domain resource assignment field and/or the frequency-domain resource assignment field in the sidelink control information, and time-frequency domain positions corresponding to the remaining transmission resources of the N transmission resources are determined in combination with a time-domain interval between adjacent time-domain resource positions. Optionally, the time-domain interval between the adjacent time-domain resource positions is predefined by the communication protocol, or the time-domain interval between the adjacent time-domain resource positions is configured by the network device or is preconfigured, or the time-domain interval between the adjacent time-domain resource positions is indicated by a time-domain interval field in the sidelink control information, which is not limited by the embodiments of the present disclosure. For example, the time-domain resource assignment field and/or the frequency-domain resource assignment field in the sidelink control information indicates that a first transmission resource of four transmission resources is a time-frequency resource position corresponding to Slot a, and the time-domain interval in the sidelink control information indicates a time-domain interval k between the adjacent time-domain resource positions, and then the remaining transmission resources of the four transmission resources are time-frequency resource positions corresponding to Slot a+k, Slot a+2k, and Slot a+3k, respectively.

According to the description of the above embodiments, in a case where the sidelink transmission is performed on the licensed spectrum, two fields of "time resource assignment" and "frequency resource assignment" in the sidelink control information sent by the terminal device can only indicate at most three transmission resources reserved for a current transport block. In the embodiments of the present disclosure, in a case where the sidelink transmission is performed on the unlicensed spectrum, the sidelink control information sent by the SL UE includes the time-domain assignment field and the frequency-domain assignment field, and optionally, the time-domain assignment field may be called "time resource assignment", and the frequency-domain assignment field can be called "frequency resource assignment". Unlike the sidelink control information sent on the licensed spectrum that can only indicate at most three transmission resources reserved for the current transport block due to the limitation of the number of bits, in the embodiments of the present disclosure, when the sidelink control information is sent on the unlicensed spectrum, the number of bits occupied by the time-domain assignment field and the frequency-domain assignment field in the sidelink control information can be increased, that is, the number of bits occupied by the two fields of "time resource assignment" and "frequency resource assignment" can be increased, so that the sidelink control information indicates at most more than three transmission resources.

Optionally, in the case where the sidelink transmission is performed on the unlicensed spectrum, the sidelink control information transmitted during the initial transmission is used to indicate all transmission resources reserved by the SL UE for the first transport block, and all the transmission resources include a transmission resource used for the initial transmission. The sidelink control information transmitted during the retransmission is used to indicate part of the transmission resources reserved by the SL UE for the first transport block, and the part of the transmission resources includes a transmission resource used for the retransmission.

Figure 8:
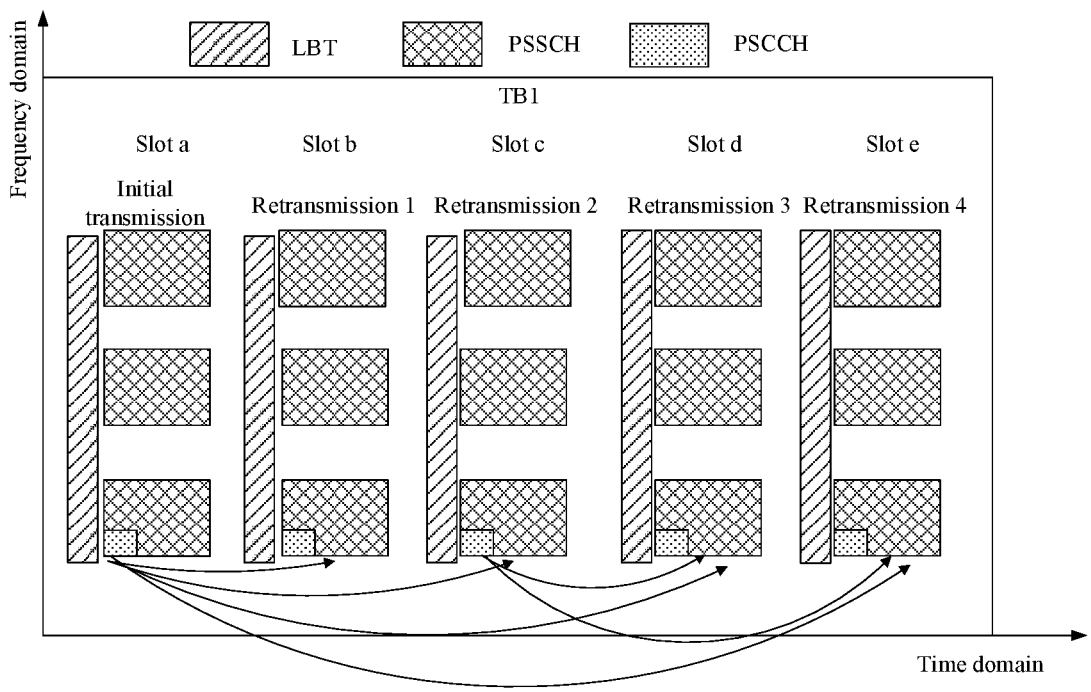
FIG. 8 is a schematic diagram of indicating reserved transmission resources provided by an embodiment of the present disclosure.

For example, as shown in FIG. 8, it shows a schematic diagram of indicating reserved transmission resources provided by an embodiment of the present disclosure. It is assumed that the transmission resources reserved by the SL UE for the first transport block include five time-frequency resource positions, which are time-frequency resource positions corresponding to Slot a, Slot b, Slot c, Slot d and Slot e, respectively, where a time-frequency resource position corresponding to Slot a is used for an initial transmission process of transmitting the first transport block, and time-frequency resource positions corresponding to Slot b, Slot c, Slot d, and Slot e are used for a retransmission process of the first transport block. For the sidelink control information sent at the time-frequency resource position corresponding to Slot a, this sidelink control information may indicate the time-frequency resource positions corresponding to Slot a, Slot b, Slot c, Slot d and Slot e that are reserved by the SL UE. For the sidelink control information sent at the time-frequency resource position corresponding to Slot c, this sidelink control information may indicate the time-frequency resource positions corresponding to Slot c, Slot d, and Slot e that are reserved by the SL UE.

Manner 2: the N transmission resources are indicated by the time-domain resource assignment field, the frequency-domain resource assignment field and a first period field of the sidelink control information.

In an example, the sidelink control information includes the first period field, the first period field is used to indicate a first time-domain period between periodic transmission resource groups reserved for the first transport block, and the transmission resource group includes at least one transmission resource indicated by the time-domain resource assignment field and/or the frequency-domain resource assignment field.

According to the description of the above embodiments, in the case where the sidelink transmission is performed on the licensed spectrum, the two fields of "time resource assignment" and "frequency resource assignment" in the sidelink control information sent by the terminal device can only indicate at most three transmission resources reserved for a current transport block. In the embodiments of the present disclosure, in the case where the sidelink transmission is performed on the unlicensed spectrum, the sidelink control information sent by the SL UE further includes the first period field in addition to the time-domain resource assignment field and the frequency-domain resource assignment, the first period field is used to indicate the first time-domain period between the periodic transmission resource groups reserved for the first transport block, and the transmission resource group includes the at least one transmission resource indicated by the time-domain resource assignment field and/or the frequency-domain resource assignment field. That is, in the case where the sidelink transmission is performed on the unlicensed spectrum, the at least one transmission resource indicated by the time-domain resource assignment field and/or the frequency-domain resource assignment field in the sidelink control information may be periodically reserved, and the time-domain period for periodically reserving the at least one transmission resource is also provided in the sidelink control information. The embodiments of the present disclosure do not limit a length of the first time-domain period. Optionally, the length of the first time-domain period may be configured by the network device or pre-configured, or the length of the first time-domain period is autonomously set by the terminal device according to its own service requirements.

When the number of transmission resources indicated by the sidelink control information is increased by increasing the number of bits occupied by the time-domain resource assignment field and/or the frequency-domain resource assignment field, it is assumed that one transmission resource corresponds to one bit, and N bits need to be occupied when the N transmission resources need to be indicated, therefore the time-domain resource assignment field and/or the frequency-domain resource assignment field occupy a relatively large number of bits when N is large, which will greatly increase signaling overhead of the sidelink control information. In view of this, the embodiments of the present disclosure propose to add the first period field in the sidelink control information to periodically indicate the transmission resource indicated by the time-domain resource assignment field and/or the frequency-domain resource assignment field. Compared to an increase in the number of bits occupied by the time-domain resource assignment field and/or the frequency-domain resource assignment field, less number of bits are increased by adding the first period domain, reducing the signaling overhead of the sidelink control information.

Figure 9:
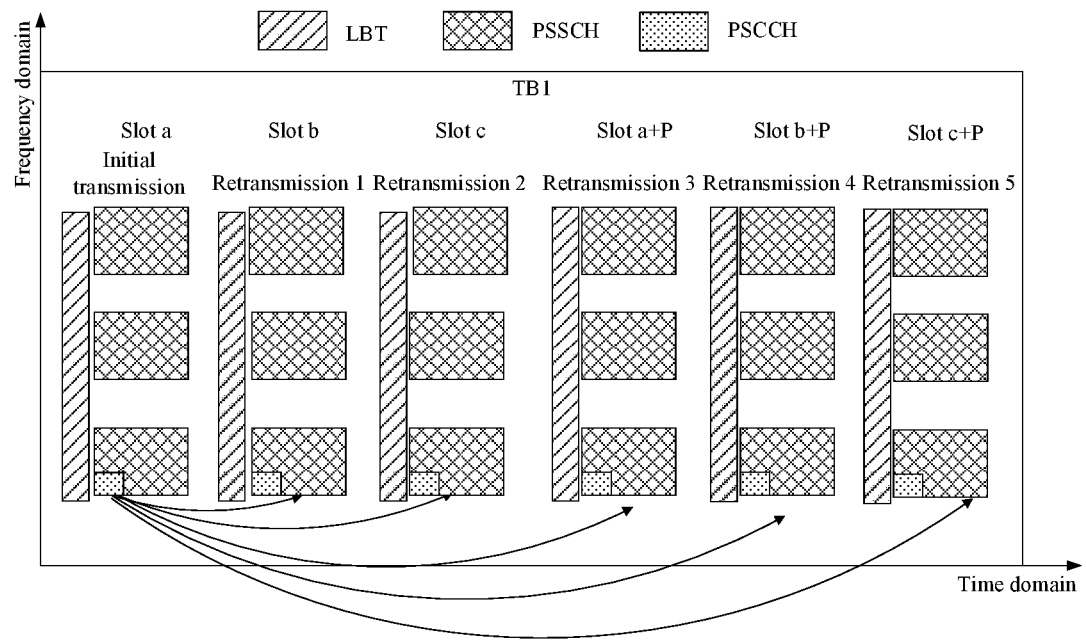
FIG. 9 is a schematic diagram of indicating reserved transmission resources provided by another embodiment of the present disclosure.

For example, as shown in FIG. 9, it shows a schematic diagram of indicating reserved transmission resources provided by an embodiment of the present disclosure. During the initial transmission of the first transport block, the sidelink control information may be sent, the time-domain resource assignment field and/or the frequency-domain resource assignment field of the sidelink control information may indicate time-frequency resource positions corresponding to Slot a, Slot b an Slot c that are reserved by the SL UE, and the time-frequency resource positions corresponding to Slot a, Slot b an Slot c may form a transmission resource group. In addition, the first period field in the sidelink control information may indicate a time-domain period P of the transmission resource group, so that the sidelink control information may also indicate time-frequency resource positions corresponding to Slot a+P, Slot b+P, and Slot c+P. The time-frequency resource position corresponding to Slot a is used for the initial transmission process of transmitting the first transport block, and time-frequency resource positions corresponding to Slot b, Slot c, Slot a+P, Slot b+P, and Slot c+P are used for the retransmission process of the first transport block.

In a case where the time-domain period P is 0, the sidelink control information only indicates the time-frequency resource positions reserved for the first transport block through the time-domain resource assignment field and/or the frequency-domain resource assignment field, that is, the sidelink control information only indicates the time-frequency resource positions corresponding to Slot a, Slot b, and Slot c that are reserved by the SL UE.

Manner 3: the N transmission resources are indicated by the time-domain resource assignment field, the frequency-domain resource assignment field, the first period field and a first period parameter field of the sidelink control information.

In an example, the sidelink control information further includes the first period parameter field, and the first period parameter field is used to indicate the number of reserved periods of the transmission resource group.

With the above-mentioned Manner 2, the sidelink control information may indicate transmission resources within two periods reserved by the SL UE. In order to enable the sidelink control information to indicate transmission resources within more periods reserved by the SL UE, the embodiments of the present disclosure propose the Manner 3, in which the first period parameter field is further added to the sidelink control information, and the first period parameter field is used to indicate the number of reserved periods of the transmission resource group as described above. That is, the sidelink control information indicates the transmission resource group through the time-domain resource assignment field and/or the frequency-domain resource assignment field, indicates the time-domain period between the transmission resource groups through the first period field, and indicates the number of reserved periods of the transmission resource groups through the first period parameter field, so as to achieve a purpose of indicating transmission resources within a plurality of periods reserved by the SL UE, thereby indicating more transmission resources while ensuring that the number of bits of the sidelink control information is not too large. The embodiments of the present disclosure do not limit a value of the number of the reserved periods. Optionally, the number of the reserved periods may be determined by the terminal device in combination with a value of N and a value of the first time-domain period.

Figure 10:
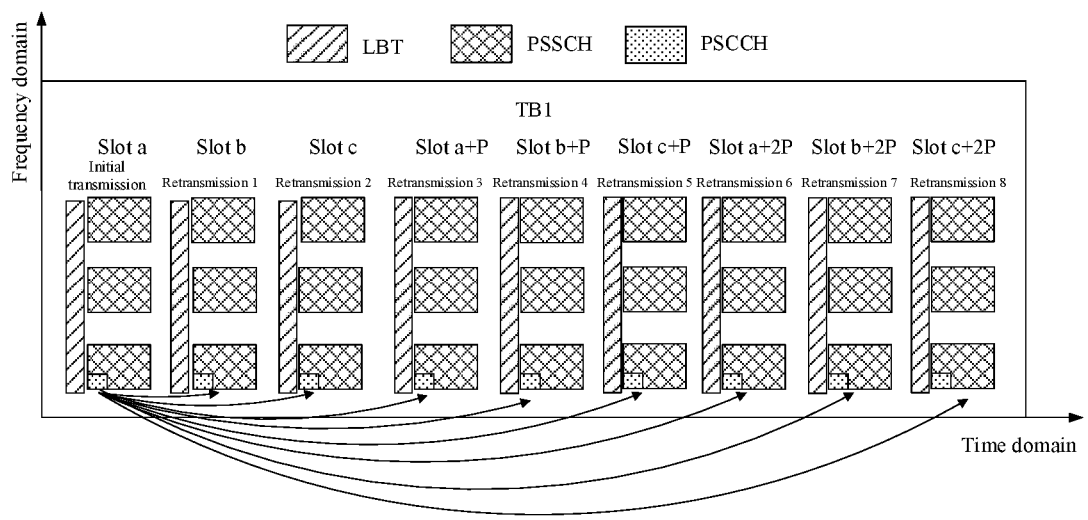
FIG. 10 is a schematic diagram of indicating reserved transmission resources provided by still another embodiment of the present disclosure.

For example, as shown in FIG. 10, it shows a schematic diagram of indicating reserved transmission resources provided by an embodiment of the present disclosure. During the initial transmission of the first transport block, the sidelink control information may be sent, the time-domain resource assignment field and/or the frequency-domain resource assignment field of the sidelink control information may indicate time-frequency resource positions corresponding to Slot a, Slot b an Slot c that are reserved by the SL UE, and the time-frequency resource positions corresponding to Slot a, Slot b an Slot c may form a transmission resource group. In addition, the first period field in the sidelink control information may indicate a time-domain period P of the transmission resource group, so that the sidelink control information may also indicate time-frequency resource positions corresponding to Slot a+P, Slot b+P, and Slot c+P. In addition, the first period parameter field in the sidelink control information may indicate the number h of reserved periods of the transmission resource group. Assuming that h is 2, the sidelink control information may also indicate time-frequency resource positions corresponding to Slot a+2P, Slot b+2P, and Slot c+2P. The time-frequency resource position corresponding to Slot a is used for the initial transmission process of transmitting the first transport block, and time-frequency resource positions corresponding to Slot b, Slot c, Slot a+P, Slot b+P, Slot c+P, Slot a+2P, Slot b+2P and Slot c+2P are used for the retransmission process of the first transport block.

In a case where the time-domain period P is 0 and/or the number of reserved periods h is 0, the sidelink control information only indicates the time-frequency resource position reserved for the first transport block through the time-domain resource assignment field and/or the frequency-domain resource assignment field, that is, the sidelink control information only indicates the time-frequency resource positions corresponding to Slot a, Slot b, and Slot c that are reserved by the SL UE.

Optionally, for the above-mentioned Manner 2 and Manner 3, two transmission resources with a time-domain interval of the first time-domain period in two adjacent transmission resource groups have the same frequency-domain resource position. That is, in a case where the N transmission resources reserved by the SL UE for the first transport block can be divided into a plurality of transmission resource groups for periodic reservation, the two transmission resources with the time-domain interval of the first time-domain period in the two adjacent transmission resource groups have the same frequency-domain resource position, so as to realize the purpose of periodic reservation. For example, as shown in FIG. 9, a frequency-domain resource position corresponding to Slot a+P is the same as a frequency-domain resource position corresponding to Slot a, a frequency-domain resource position corresponding to Slot b+P is the same as a frequency-domain resource position corresponding to Slot b, and a frequency-domain resource position corresponding to Slot c+P is the same as a frequency-domain resource position corresponding to Slot c. For another example, as shown in FIG. 10, frequency-domain resource positions corresponding to Slot a, Slot a+p, and Slot a+2p are the same, frequency-domain resource positions corresponding to Slot b, Slot b+p, and Slot b+2p are the same, and frequency-domain resource positions corresponding to Slot c, Slot c+p, and Slot c+2p are the same.

It should be noted that in the above FIGS. 8, 9 and 10, the initial transmission and the retransmission of the first transport block are not continuous in the frequency domain, which is to meet requirements for a transmission bandwidth by the unlicensed spectrum. If the SL UE needs to send a relatively large amount of communication data which will occupy a relatively large bandwidth, the manner in which the frequency domain is continuous in the foregoing FIG. 3 may also be used, which is not limited in the embodiments of the present disclosure.

To sum up, in the technical solutions provided by the embodiments of the present disclosure, the sidelink control information can indicate more than three transmission resources by increasing the number of bits occupied by the time-domain assignment field and the frequency-domain assignment field in the sidelink control information, realizing the indication of as many reserved transmission resources as possible in the sidelink control information so as to avoid the situation where it fails to continue to indicate the reserved transmission resources subsequently due to LBT failure and results in resource collision with other terminal devices, thereby improving the communication reliability.

In addition, in the technical solutions provided by the embodiments of the present disclosure, the period field is added to the sidelink control information, the period field is used to indicate the time-domain period between the periodic transmission resource groups reserved for the current transport block, and the transmission resource group includes the at least one transmission resource indicated by the time-domain resource assignment field and/or the frequency-domain resource assignment field, so that the at least one transmission resource indicated by the time-domain resource assignment field and/or the frequency-domain resource assignment field in the sidelink control information can be periodically reserved and indicated. Compared to an increase in the number of bits occupied by the time-domain resource assignment field and/or the frequency-domain resource assignment field, less number of bits are increased by adding the first period domain, reducing the signaling overhead of the sidelink control information.

In addition, in the technical solutions provided by the embodiments of the present disclosure, the period parameter field is added to the sidelink control information, and the period parameter field is used to indicate the number of reserved periods of the transmission resource group, so that the sidelink control information indicates the transmission resource group through the time-domain resource assignment field and/or the frequency-domain resource assignment field, indicates the time-domain period between the transmission resource groups through the period field, and indicates the number of reserved periods of the transmission resource group through the period parameter field, so as to achieve a purpose of indicating transmission resources within a plurality of periods reserved by the terminal device, and realize the indication of more transmission resources while ensuring that the number of bits of the sidelink control information is not too large.

In the embodiments of the present disclosure, the sidelink control information sent for the first transport block can not only indicate the N transmission resources reserved by the SL UE for the first transport block, but also indicate transmission resources reserved by the SL UE for other transport blocks. Optionally, a situation in which the sidelink control information sent for the first transport block indicates the transmission resources reserved by the SL UE for the first transport block may be referred to as intra-TB reservation, and a situation in which the sidelink control information sent for the first transport block indicates the transmission resources reserved by the SL UE for other transport blocks may be referred to as inter-TB reservation. The situation where the sidelink control information sent for the first transport block indicates the transmission resources reserved by the SL UE for other transport blocks is explained below.

In an example, the sidelink control information is used to indicate transmission resources reserved for M transport blocks, the M transport blocks include the first transport block, and M is an integer greater than 1. The sidelink control information further includes a second period field and a second period parameter field, the second period field is used to indicate a second time-domain period between periodic transmission resource sets reserved for the M transport blocks, and the second period parameter field is used to indicate the number of reserved periods of the transmission resource set.

According to the description of the above embodiments, in the case where the sidelink transmission is performed on the licensed spectrum, a field of "Resource reservation period" in the sidelink control information sent by the terminal device may indicate a transmission resource reserved by the terminal device for the next transport block. In the embodiments of the present disclosure, in the case where the sidelink transmission is performed on the unlicensed spectrum, the SL UE may also indicate the transmission resources it reserves for the next transport block. For example, the sidelink control information for the first transport block includes a time-domain assignment field, a frequency-domain assignment field and a second period field, the time-domain assignment field and the frequency-domain assignment field are used to indicate transmission resources reserved for the first transport block, and the second period field is used to indicate the second time-domain period between the periodic transmission resource sets reserved for the M transport blocks. Optionally, the second period field may be the above-mentioned "Resource reservation period". In the embodiments of the present disclosure, in a case where the sidelink control information indicates transmission resources reserved for the current transport block and the next transport block, transmission resources reserved for each transport block may be referred to as a transmission resource set, since the M transport blocks are periodically transmitted, the transmission resource sets reserved by the SL UE for the M transport blocks are also periodically reserved. Optionally, the M transport blocks include the first transport block and the next transport block next to the first transport block, so that the second period field may indicate a time-domain period between a transmission resource set reserved for the first transport block and a transmission resource set reserved for the next transport block, and this time-domain period is referred to as a second time-domain period. In order to indicate as many reserved transmission resources as possible, in the embodiments of the present disclosure, the sidelink control information further includes the second period parameter field, and the second period parameter field is used to indicate the number of reserved periods of the transmission resource sets, so that the sidelink control information may indicate transmission resources reserved by the SL UE for the next transport block next to the first transport block and the transport block next to the next transport block.

Figure 11:
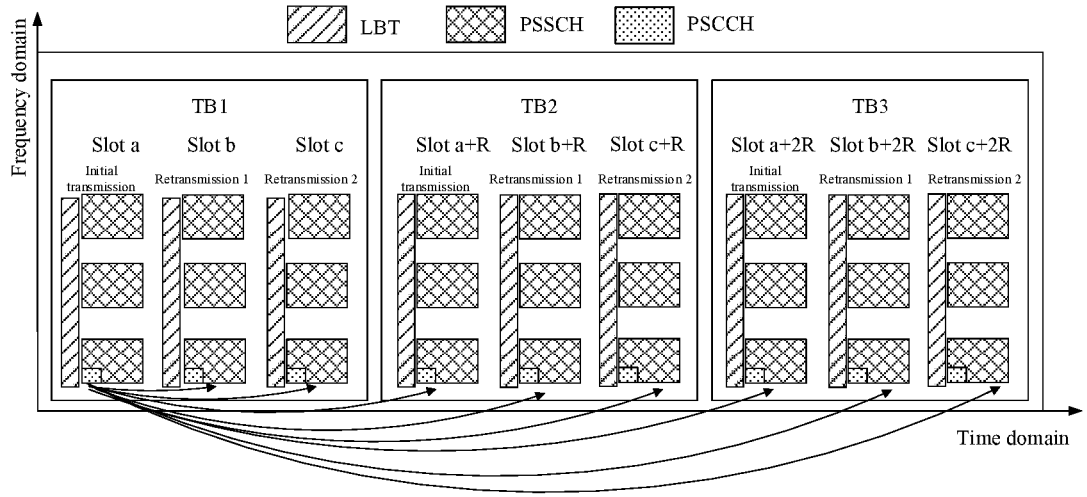
FIG. 11 is a schematic diagram of indicating reserved transmission resources provided by yet another embodiment of the present disclosure.

For example, as shown in FIG. 11, it shows a schematic diagram of indicating reserved transmission resources provided by an embodiment of the present disclosure. During the initial transmission of the first transport block, the sidelink control information may be sent, the time-domain resource assignment field and/or the frequency-domain resource assignment field of the sidelink control information may indicate the transmission resources reserved by the SL UE for the first transport block, which are time-frequency resource positions corresponding to Slot a, Slot b an Slot c, respectively, and the time-frequency resource positions corresponding to Slot a, Slot b an Slot c may form a transmission resource set. In addition, the second period field in the sidelink control information may indicate a time-domain period R between a transmission resource set reserved for the first transport block and a transmission resource set reserved for a second transport block, so that the sidelink control information may further indicate transmission resources reserved for the second transport block, which are time-frequency resource positions corresponding to Slot a+R, Slot b+R, and Slot c+R, respectively, and the second transport block is a transport block next to the first transport block. In addition, the second period parameter field in the sidelink control information may indicate the number j of reserved periods of the transmission resource set. Assuming that j is 2, the sidelink control information may also indicate transmission resources reserved for a third transport block, that is, time-frequency resource positions corresponding to Slot a+2R, Slot b+2R, and Slot c+2R, and the third transport block is a transport block next to the second transport block. The time-frequency resource positions corresponding to Slot a, Slot a+R, and Slot a+2R are used for initial transmission processes of transmitting the first transport block, the second transport block, and the third transport block, respectively, and time-frequency resource positions corresponding to Slot b and Slot c, Slot b+R and Slot c+R, and Slot b+2R and Slot c+2R are used for retransmission processes of the first transport block, the second transport block, and the third transport block, respectively.

In a case where the time-domain period R is 0 and/or the number of reserved periods j is 0, the sidelink control information only indicates the time-frequency resource position reserved for the first transport block through the time-domain resource assignment field and/or the frequency-domain resource assignment field, that is, the sidelink control information only indicates the time-frequency resource positions corresponding to Slot a, Slot b, and Slot c that are reserved by the SL UE.

Optionally, two transmission resources with the time-domain interval of the second time-domain period in two adjacent transmission resource sets have the same frequency-domain resource position. That is, in a case where the transmission resources reserved by the SL UE for the M transport blocks can be divided into a plurality of transmission resource sets for periodic reservation, the two transmission resources with the time-domain interval of the second time-domain period in the two adjacent transmission resource sets have the same frequency-domain resource position, so as to realize the purpose of periodic reservation. For example, as shown in FIG. 11, the frequency-domain resource positions corresponding to Slot a+2R, Slot a+R and Slot R are the same, the frequency-domain resource positions corresponding to Slot b+2R, Slot b+R and Slot b are the same, and the frequency-domain resource positions corresponding to Slot c+2R, Slot c+R and Slot c are the same.

It should be noted that in the above FIG. 11, the initial transmission and the retransmissions of the M transport blocks are not continuous in the frequency domain, which is to meet requirements for a transmission bandwidth by the unlicensed spectrum. If the SL UE needs to send a relatively large amount of communication data which will occupy a relatively large bandwidth, the manner in which the frequency domain is continuous in the foregoing FIG. 3 may also be used, which is not limited in the embodiments of the present disclosure.

To sum up, in the technical solutions provided by the embodiments of the present disclosure, the transmission resource set reserved for the current transport block is indicated through the time-domain assignment field and the frequency-domain assignment field in the sidelink control information, the time-domain period between the periodic transmission resource sets reserved for a plurality of transport blocks including the current transport block is indicated through the period field in the sidelink control information, and the period parameter field is added to the sidelink control information and is used to indicate the number of reserved periods of the transmission resource set, thereby providing a method for indicating transmission resources reserved by the terminal device for the plurality of transport blocks when the sidelink transmission is performed based on the unlicensed spectrum. In addition, in the embodiments of the present disclosure, the indication of the transmission resources reserved by the terminal device for more than two transport blocks is realized through the period parameter field in the sidelink control information, thereby achieving the purpose of indicating as many reserved transmission resources as possible, and further improving the communication reliability.

Figure 12:
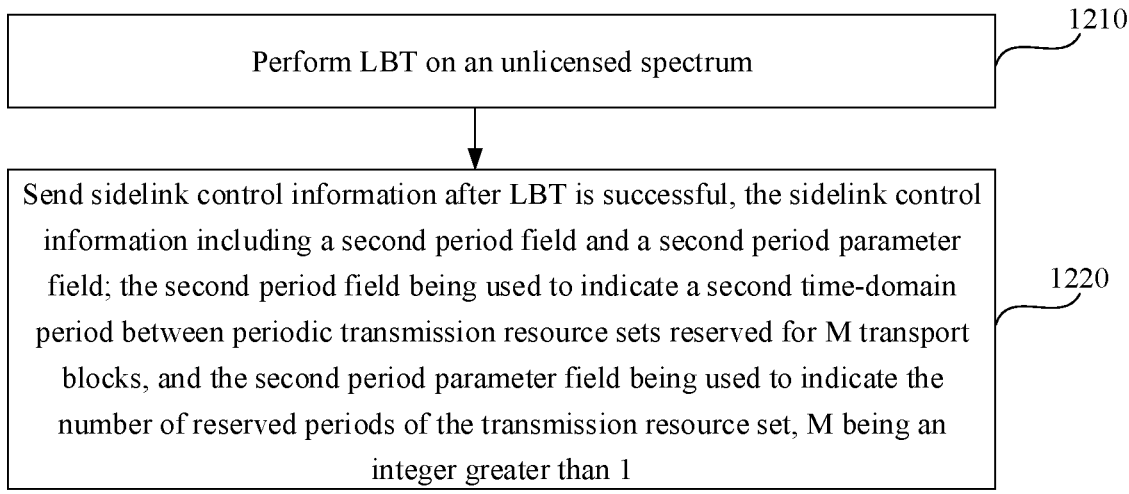
FIG. 12 is a flowchart of a method for resource reservation provided by another embodiment of the present disclosure.

Referring to FIG. 12, it shows a flowchart of a method for resource reservation provided by an embodiment of the present disclosure, the method can be applied to the network architecture shown in FIG. 1, for example, the method can be applied to a terminal device that performs sidelink transmission on an unlicensed spectrum. The method may include the following steps.

In step 1210, LBT is performed on the unlicensed spectrum.

In step 1220, sidelink control information is sent after the LBT is successful, the sidelink control information includes a second period field and a second period parameter field, the second period field is used to indicate a second time-domain period between periodic transmission resource sets reserved for M transport blocks, and the second period parameter field is used to indicate the number of reserved periods of the transmission resource sets, M being an integer greater than 1.

In an example, two transmission resources with a time-domain interval of the second time-domain period in two adjacent transmission resource sets have the same frequency-domain resource position.

In an example, the M transport blocks include a first transport block, and the sidelink control information is further used to indicate N transmission resources reserved for the first transport block, and an upper limit of N is an integer greater than 3.

In an example, the sidelink control information further includes a time-domain resource assignment field and/or a frequency-domain resource assignment field, the time-domain resource assignment field is used to indicate at least one time-domain resource position of the N transmission resources, and the frequency-domain resource assignment field is used to indicate at least one frequency-domain resource position of the N transmission resources.

In an example, the sidelink control information further includes a first period field, the first period field is used to indicate a first time-domain period between periodic transmission resource groups reserved for the first transport block, and the transmission resource group includes at least one transmission resource indicated by the time-domain resource assignment field and/or the frequency-domain resource assignment field.

In an example, the sidelink control information further includes a first period parameter field, and the first period parameter field is used to indicate the number of reserved periods of the transmission resource groups.

In an example, two transmission resources with the time-domain interval of the first time-domain period in two adjacent transmission resource groups have the same frequency-domain resource position.

In an example, time-domain resource positions of the N transmission resources are located within a transmission delay range of the first transport block.

From the description of method embodiments corresponding to FIGS. 7 to 11, the description of the method embodiments corresponding to FIG. 12 can be obtained. For the description of the embodiments of FIG. 12, reference may be made to the above-mentioned method embodiments, which is not repeated here.

To sum up, in the technical solutions provided by the embodiments of the present disclosure, the transmission resource set reserved for the current transport block is indicated through the time-domain assignment field and the frequency-domain assignment field in the sidelink control information, the time-domain period between the periodic transmission resource sets reserved for a plurality of transport blocks including the current transport block is indicated through the period field in the sidelink control information, and the period parameter field is added to the sidelink control information and is used to indicate the number of reserved periods of the transmission resource set, thereby providing a method for indicating transmission resources reserved by the terminal device for the plurality of transport blocks when the sidelink transmission is performed based on the unlicensed spectrum. In addition, in the embodiments of the present disclosure, the indication of the transmission resources reserved by the terminal device for more than two transport blocks is realized through the period parameter field in the sidelink control information, thereby achieving the purpose of indicating as many reserved transmission resources as possible, and improving the communication reliability.

The following are apparatus embodiments of the present disclosure, which can be used to perform the method embodiments of the present disclosure. For details not disclosed in the apparatus embodiments of the present disclosure, reference may be made to the method embodiments of the present disclosure.

Figure 13:
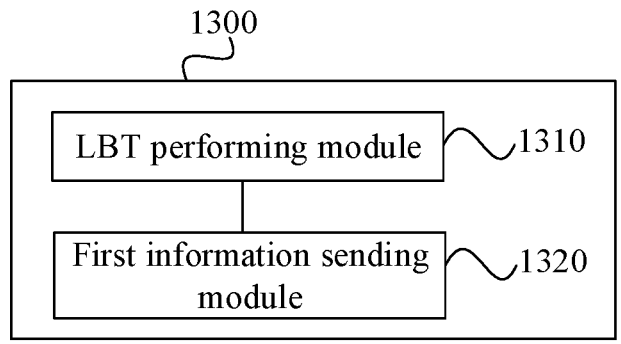
FIG. 13 is a block diagram of an apparatus for resource reservation provided by an embodiment of the present disclosure.

Referring to FIG. 13, it shows a block diagram of an apparatus for resource reservation provided by an embodiment of the present disclosure, the apparatus has a function of implementing the above method examples, and the function may be implemented by hardware or by executing corresponding software by hardware. The apparatus may be the above-mentioned terminal device that performs the sidelink transmission on the unlicensed spectrum, or may be provided in the terminal device that performs the sidelink transmission on the unlicensed spectrum. As shown in FIG. 13, the apparatus 1300 may include: an LBT performing module 1310 and a first information sending module 1320.

The LBT performing module 1310 is configured to perform LBT on the unlicensed spectrum.

The first information sending module 1320 is configured to send sidelink control information after the LBT is successful, wherein the sidelink control information is used to indicate N transmission resources reserved for a first transport block, and an upper limit of N is an integer greater than 3.

In an example, the sidelink control information includes a time-domain resource assignment field and/or a frequency-domain resource assignment field, the time-domain resource assignment field is used to indicate at least one time-domain resource position of the N transmission resources, and the frequency-domain resource assignment field is used to indicate at least one frequency-domain resource position of the N transmission resources.

In an example, the sidelink control information includes a first period field, the first period field is used to indicate a first time-domain period between periodic transmission resource groups reserved for the first transport block, and the transmission resource group includes at least one transmission resource indicated by the time-domain resource assignment field and/or the frequency-domain resource assignment field.

In an example, the sidelink control information further includes a first period parameter field, and the first period parameter field is used to indicate the number of reserved periods of the transmission resource groups.

In an example, two transmission resources with a time-domain interval of the first time-domain period in two adjacent transmission resource groups have the same frequency-domain resource position.

In an example, the sidelink control information is used to indicate transmission resources reserved for M transport blocks, the M transport blocks include the first transport block, and M is an integer greater than 1, and the sidelink control information further includes a second period field and a second period parameter field, the second period field is used to indicate a second time-domain period between periodic transmission resource sets reserved for the M transport blocks, and the second period parameter field is used to indicate the number of reserved periods of the transmission resource sets.

In an example, two transmission resources with the time-domain interval of the second time-domain period in two adjacent transmission resource sets have the same frequency-domain resource position.

In an example, time-domain resource positions of the N transmission resources are located within a transmission delay range of the first transport block.

To sum up, according to the technical solutions provided by the embodiments of the present disclosure, in a case where the terminal device performs the sidelink transmission on the unlicensed spectrum, the terminal device performs LBT on the unlicensed spectrum and after the LBT is successful, the terminal device sends the sidelink control information that is used to indicate the transmission resources reserved for the transport block, thereby providing a method for indicating the transmission resources reserved by the terminal device when the sidelink transmission is performed based on the unlicensed spectrum. Considering that on the unlicensed spectrum, the terminal device needs to the perform LBT and can only transmit the communication data after the LBT is successful, in a case where the LBT fails, the terminal device will not be able to transmit the communication data, and will not be able to indicate the reserved transmission resources to other terminal devices, and if the reserved transmission resources are not indicated in the sidelink control information sent by the terminal device when the previous LBT is successful, other terminal devices cannot know the transmission resources reserved by the terminal device, and when the reserved transmission resources are just selected by the other terminal devices to transmit the communication data, resource collision between the terminal device and other terminal devices may occur, reducing communication reliability. In the embodiments of the present disclosure, the sidelink control information sent by the terminal device may indicate more than three transmission resources, so that the reserved transmission resources may be indicated as many as possible in the sidelink control information so as to avoid the situation where it fails to continue to indicate the reserved transmission resources subsequently due to LBT failure, resulting in resource collision with other terminal devices. In the embodiments of the present disclosure, factors that affect communication quality are fully considered, and the communication reliability is improved.

Figure 14:
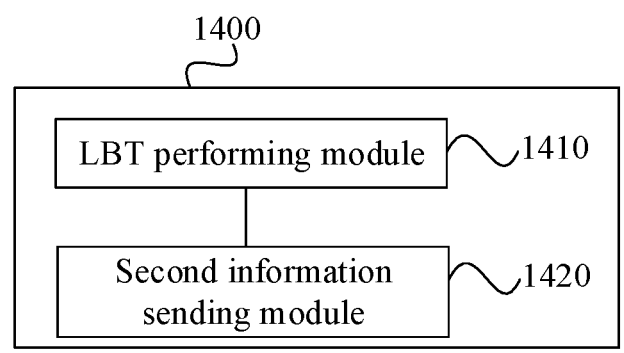
FIG. 14 is a block diagram of an apparatus for resource reservation provided by another embodiment of the present disclosure.

Referring to FIG. 14, it shows a block diagram of an apparatus for resource reservation provided by an embodiment of the present disclosure, the apparatus has a function of implementing the above method examples, and the function may be implemented by hardware or by executing corresponding software by hardware. The apparatus may be the above-mentioned terminal device that performs the sidelink transmission on the unlicensed spectrum, or may be provided in the terminal device that performs the sidelink transmission on the unlicensed spectrum. As shown in FIG. 14, the apparatus 1400 may include: an LBT performing module 1410 and a second information sending module 1420.

The LBT performing module 1410 is configured to perform LBT on the unlicensed spectrum.

The second information sending module 1420 is configured to send sidelink control information after the LBT is successful, the sidelink control information includes a second period field and a second period parameter field, the second period field is used to indicate a second time-domain period between periodic transmission resource sets reserved for M transport blocks, and the second period parameter field is used to indicate the number of reserved periods of the transmission resource sets, M being an integer greater than 1.

In an example, two transmission resources with a time-domain interval of the second time-domain period in two adjacent transmission resource sets have the same frequency-domain resource position.

In an example, the M transport blocks include a first transport block, and the sidelink control information is further used to indicate N transmission resources reserved for the first transport block, and an upper limit of N is an integer greater than 3.

In an example, the sidelink control information further includes a time-domain resource assignment field and/or a frequency-domain resource assignment field, the time-domain resource assignment field is used to indicate at least one time-domain resource position of the N transmission resources, and the frequency-domain resource assignment field is used to indicate at least one frequency-domain resource position of the N transmission resources.

In an example, the sidelink control information further includes a first period field, the first period field is used to indicate a first time-domain period between periodic transmission resource groups reserved for the first transport block, and the transmission resource group includes at least one transmission resource indicated by the time-domain resource assignment field and/or the frequency-domain resource assignment field.

In an example, the sidelink control information further includes a first period parameter field, and the first period parameter field is used to indicate the number of reserved periods of the transmission resource groups.

In an example, two transmission resources with the time-domain interval of the first time-domain period in two adjacent transmission resource groups have the same frequency-domain resource position.

In an example, time-domain resource positions of the N transmission resources are located within a transmission delay range of the first transport block.

To sum up, in the technical solutions provided by the embodiments of the present disclosure, the transmission resource set reserved for the current transport block is indicated through the time-domain assignment field and the frequency-domain assignment field in the sidelink control information, the time-domain period between the periodic transmission resource sets reserved for a plurality of transport blocks including the current transport block is indicated through the period field in the sidelink control information, and the period parameter field is added to the sidelink control information and is used to indicate the number of reserved periods of the transmission resource set, thereby providing a method for indicating transmission resources reserved by the terminal device for the plurality of transport blocks when the sidelink transmission is performed based on the unlicensed spectrum. In addition, in the embodiments of the present disclosure, the indication of the transmission resources reserved by the terminal device for more than two transport blocks is realized through the period parameter field in the sidelink control information, thereby achieving the purpose of indicating as many reserved transmission resources as possible, further improving the communication reliability.

It should be noted that, the functions implemented by the apparatus provided in the above embodiments are only illustrated by using the division of the above functional modules as an example. In practical applications, the above functions can be assigned to and completed by different functional modules according to actual needs. That is, a content structure of the apparatus is divided into different functional modules to complete all or part of the functions described above.

Regarding the apparatus in the above-mentioned embodiments, a specific manner in which each module performs operations has been described in detail in the method embodiments, and will not be described in detail here.

Figure 15:
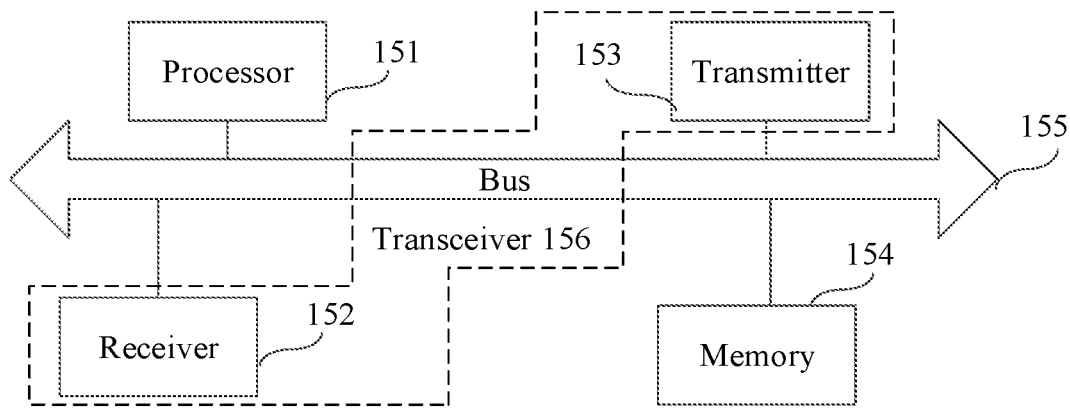
FIG. 15 is a structural block diagram of a terminal device provided by an embodiment of the present disclosure.

Referring to FIG. 15, it shows a schematic structural diagram of a terminal device 150 provided by an embodiment of the present disclosure, and the terminal device can be, for example, configured to perform the above method for resource reservation. Specifically, the terminal device 150 may include a processor 151, a receiver 152, a transmitter 153, a memory 154 and a bus 155.

The processor 151 includes one or more processing cores, and the processor 151 performs various functional applications and information processing by running software programs and modules.

The receiver 152 and the transmitter 153 may be implemented as a transceiver 156, which may be a communication chip.

The memory 154 is connected to the processor 151 through the bus 155.

The memory 154 can be configured to store a computer program, and the processor 151 is configured to perform the computer program to implement various steps performed by the terminal device in the above method embodiments.

In addition, the memory 154 can be implemented by any type of volatile or non-volatile storage device or a combination thereof, and the volatile or non-volatile storage device includes but is not limited to: a Random-Access Memory (RAM), a Read-Only Memory (ROM), an Erasable Programmable Read-Only Memory (EPROM), an Electrically Erasable Programmable Read-Only Memory (EEPROM), a flash memory or other solid state storage technologies, a Compact Disc Read-Only Memory (CD-ROM), a Digital Video Disc (DVD) or other optical storage, a cassette, a magnetic tape, a magnetic disk storage or other magnetic storage devices.

In a possible implementation, the processor 151 is configured to perform LBT on an unlicensed spectrum; and the transceiver 156 is configured to send sidelink control information after the LBT is successful, wherein the sidelink control information is used to indicate N transmission resources reserved for a first transport block, and an upper limit of N is an integer greater than 3.

In an example, the sidelink control information includes a time-domain resource assignment field and/or a frequency-domain resource assignment field, the time-domain resource assignment field is used to indicate at least one time-domain resource position of the N transmission resources, and the frequency-domain resource assignment field is used to indicate at least one frequency-domain resource position of the N transmission resources.

In an example, the sidelink control information includes a first period field, the first period field is used to indicate a first time-domain period between periodic transmission resource groups reserved for the first transport block, and the transmission resource group includes at least one transmission resource indicated by the time-domain resource assignment field and/or the frequency-domain resource assignment field.

In an example, the sidelink control information further includes a first period parameter field, and the first period parameter field is used to indicate the number of reserved periods of the transmission resource groups.

In an example, two transmission resources with a time-domain interval of the first time-domain period in two adjacent transmission resource groups have the same frequency-domain resource position.

In an example, the sidelink control information is used to indicate transmission resources reserved for M transport blocks, the M transport blocks include the first transport block, and M is an integer greater than 1, and the sidelink control information further includes a second period field and a second period parameter field, the second period field is used to indicate a second time-domain period between periodic transmission resource sets reserved for the M transport blocks, and the second period parameter field is used to indicate the number of reserved periods of the transmission resource sets.

In an example, two transmission resources with the time-domain interval of the second time-domain period in two adjacent transmission resource sets have the same frequency-domain resource position.

In an example, time-domain resource positions of the N transmission resources are located within a transmission delay range of the first transport block.

In another possible implementation, the processor 151 is configured to perform LBT on an unlicensed spectrum; and the transceiver 156 is configured to send sidelink control information after the LBT is successful, and the sidelink control information includes a second period field and a second period parameter field; the second period field is used to indicate a second time-domain period between periodic transmission resource sets reserved for M transport blocks, and the second period parameter field is used to indicate the number of reserved periods of the transmission resource sets, M being an integer greater than 1.

In an example, two transmission resources with a time-domain interval of the second time-domain period in two adjacent transmission resource sets have the same frequency-domain resource position.

In an example, the M transport blocks include a first transport block, and the sidelink control information is further used to indicate N transmission resources reserved for the first transport block, and an upper limit of N is an integer greater than 3.

In an example, the sidelink control information further includes a time-domain resource assignment field and/or a frequency-domain resource assignment field, the time-domain resource assignment field is used to indicate at least one time-domain resource position of the N transmission resources, and the frequency-domain resource assignment field is used to indicate at least one frequency-domain resource position of the N transmission resources.

In an example, the sidelink control information further includes a first period field, the first period field is used to indicate a first time-domain period between periodic transmission resource groups reserved for the first transport block, and the transmission resource group includes at least one transmission resource indicated by the time-domain resource assignment field and/or the frequency-domain resource assignment field.

In an example, the sidelink control information further includes a first period parameter field, and the first period parameter field is used to indicate the number of reserved periods of the transmission resource groups.

In an example, two transmission resources with the time-domain interval of the first time-domain period in two adjacent transmission resource groups have the same frequency-domain resource position.

In an example, time-domain resource position of the N transmission resources are located within a transmission delay range of the first transport block.

The embodiments of the present disclosure further provide a computer-readable storage medium having stored thereon a computer program, and the computer program is configured to be executed by a processor of a terminal device to implement the method for resource reservation as described above.

The embodiments of the present disclosure further provide a chip, including a programmable logic circuit and/or program instructions, and the chip is configured to implement the method for resource reservation as described above when running on a terminal device.

The present disclosure also provides a computer program product which, when running on a terminal device, causes a computer to perform the method for resource reservation as described above.

The technical solutions provided by the embodiments of the present disclosure may achieve the following beneficial effects.

In a case where the terminal device performs the sidelink transmission on the unlicensed spectrum, the terminal device performs LBT on the unlicensed spectrum and after the LBT is successful, the terminal device sends the sidelink control information that is used to indicate the transmission resources reserved for the transport block, thereby providing a method for indicating the transmission resources reserved by the terminal device when the sidelink transmission is performed based on the unlicensed spectrum. Considering that on the unlicensed spectrum, the terminal device needs to the perform LBT and can only transmit the communication data after the LBT is successful, in a case where the LBT fails, the terminal device will not be able to transmit the communication data, and will not be able to indicate the reserved transmission resources to other terminal devices, and if the reserved transmission resources are not indicated in the sidelink control information sent by the terminal device when the previous LBT is successful, other terminal devices cannot know the transmission resources reserved by the terminal device, and when the reserved transmission resources are just selected by the other terminal devices to transmit the communication data, resource collision between the terminal device and other terminal devices may occur, reducing communication reliability. In the embodiments of the present disclosure, the sidelink control information sent by the terminal device may indicate more than three transmission resources, so that the reserved transmission resources may be indicated as many as possible in the sidelink control information so as to avoid the situation where it fails to continue to indicate the reserved transmission resources subsequently due to LBT failure, resulting in resource collision with other terminal devices. The present disclosure fully takes into consideration factors that affect communication quality, and improves the communication reliability.

A person skilled in the art should recognize that in the foregoing one or more examples, functions described in the present disclosure may be implemented by hardware, software, firmware, or any combination thereof. When implemented by software, the foregoing functions may be stored in a computer readable medium or transmitted as one or more instructions or codes in the computer readable medium. The computer-readable medium includes a computer storage medium and a communications medium. The communications medium includes any medium that facilitates a computer program to be transmitted from one place to another. The storage medium may be any available medium accessible to a general-purpose or special-purpose computer.

Those described above are merely exemplary embodiments of the present disclosure, but are not intended to limit the present disclosure. Any modification, equivalent replacement, or improvement made within the spirit and principle of the present disclosure should fall within the protection scope of the present disclosure.

What is claimed is:

1. A method for resource reservation performed by a terminal device in connection with sidelink transmission on an unlicensed spectrum, the method comprising:

performing Listen Before Talk (LBT) on the unlicensed spectrum; and sending sidelink control information after the LBT is successful, wherein the sidelink control information is used to indicate N transmission resources reserved for a first transport block, and an upper limit of N is an integer greater than 3, wherein the sidelink control information comprises a first period field, and the first period field is used to indicate a first time-domain period between periodic transmission resource groups reserved for the first transport block, the transmission resource group comprises at least one transmission resource indicated by a time-domain resource assignment field and/or a frequency-domain resource assignment field, wherein the sidelink control information further comprises a first period parameter field, and the first period parameter field is used to indicate the number of reserved periods of the transmission resource group, and wherein the sidelink control information is used to indicate transmission resources reserved for M transport blocks, the M transport blocks comprise the first transport block, and M is an integer greater than 1, the sidelink control information further comprises a second period field and a second period parameter field, the second period field is used to indicate a second time-domain period between periodic transmission resource sets reserved for the M transport blocks, and the second period parameter field is used to indicate the number of reserved periods of the transmission resource set.

2. The method according to claim 1, wherein, the time-domain resource assignment field is used to indicate at least one time-domain resource position of the N transmission resources; and the frequency-domain resource assignment field is used to indicate at least one frequency-domain resource position of the N transmission resources.

3. The method according to claim 1, wherein two transmission resources with a time-domain interval of the first time-domain period in two adjacent transmission resource groups have the same frequency-domain resource position.

4. The method according to claim 1, wherein two transmission resources with a time-domain interval of the second time-domain period in two adjacent transmission resource sets have the same frequency-domain resource position.

5. The method according to claim 1, wherein time-domain resource positions of the N transmission resources are located within a transmission delay range of the first transport block, and data carried in the first transport block is transmitted multiple times within the transmission delay range.

6. A terminal device, comprising: a processor, and a transceiver connected to the processor; wherein:

the processor is configured to perform Listen Before Talk (LBT) on the unlicensed spectrum; and the transceiver is configured to send sidelink control information after the LBT is successful, wherein the sidelink control information is used to indicate N transmission resources reserved for a first transport block, and an upper limit of N is an integer greater than 3, wherein the sidelink control information comprises a first period field, and the first period field is used to indicate a first time-domain period between periodic transmission resource groups reserved for the first transport block, the transmission resource group comprises at least one transmission resource indicated by a time-domain resource assignment field and/or a frequency-domain resource assignment field, wherein the sidelink control information further comprises a first period parameter field, and the first period parameter field is used to indicate the number of reserved periods of the transmission resource group, and wherein the sidelink control information is used to indicate transmission resources reserved for M transport blocks, the M transport blocks comprise the first transport block, and Mis an integer greater than 1, the sidelink control information further comprises a second period field and a second period parameter field, the second period field is used to indicate a second time-domain period between periodic transmission resource sets reserved for the M transport blocks, and the second period parameter field is used to indicate the number of reserved periods of the transmission resource set.

7. The terminal device according to claim 6, wherein, the time-domain resource assignment field is used to indicate at least one time-domain resource position of the N transmission resources; and the frequency-domain resource assignment field is used to indicate at least one frequency-domain resource position of the N transmission resources.

\* \* \* \* \*